US012731495B2

(12) United States Patent
Yamashita et al.

(10) Patent No.: US 12,731,495 B2
(45) Date of Patent: Sep. 8, 2026

(54) FLYING OBJECT, AIR TRAFFIC CONTROL SYSTEM, METHOD FOR IDENTIFYING FLYING OBJECT, AND COMPUTER READABLE MEDIUM

(71) Applicant: NEC Corporation, Tokyo (JP)

(72) Inventors: Toshiaki Yamashita, Tokyo (JP); Hideo Adachi, Tokyo (JP); Hisashi Mizumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 154 days.

(21) Appl. No.: 18/273,520

(22) PCT Filed: Jan. 29, 2021

(86) PCT No.: PCT/JP2021/003129
§ 371 (c)(1),
(2) Date: Jul. 20, 2023

(87) PCT Pub. No.: WO2022/162850
PCT Pub. Date: Aug. 4, 2022

(65) Prior Publication Data
US 2024/0078917 A1 Mar. 7, 2024

(51) Int. Cl.
*G08G 5/50* (2025.01)
*G08G 5/26* (2025.01)
*G08G 5/55* (2025.01)

(52) U.S. Cl.
CPC ................. *G08G 5/50* (2025.01); *G08G 5/26* (2025.01); *G08G 5/55* (2025.01)

(58) Field of Classification Search
CPC .. G08G 5/50; G08G 5/26; G08G 5/55; G08G 5/57; G08G 5/22; G08G 5/53; G08G 5/727
See application file for complete search history.

(56) References Cited

U.S. PATENT DOCUMENTS

2013/0069828 A1 3/2013 Cheng et al.
2014/0018979 A1* 1/2014 Goossen .............. G05D 1/0016 701/3

(Continued)

FOREIGN PATENT DOCUMENTS

CN 103814619 A 5/2014
CN 107864137 A 3/2018

(Continued)

OTHER PUBLICATIONS

International Search Report for PCT Application No. PCT/JP2021/003129, mailed on Apr. 20, 2021.

(Continued)

*Primary Examiner* — Anne Marie Antonucci
*Assistant Examiner* — Luis G Del Valle
(74) *Attorney, Agent, or Firm* — Sughrue Mion, PLLC

(57) ABSTRACT

A flying object according to example embodiments includes an airframe ID control unit configured to hold an airframe ID of the flying object changed according to a predetermined change pattern, and a communication unit configured to transmit the airframe ID. An air traffic control system according to the example embodiments includes a communication unit configured to acquire a first airframe ID and position information transmitted from a flying object, and an identification unit configured to identify the flying object using the first airframe ID. When the communication unit acquires a second airframe ID different from the first airframe ID after acquiring the first airframe ID, the identification unit determines whether or not the second airframe ID indicates the flying object based on a change between the position information at the time of acquiring the first airframe ID and the position information at the time of acquiring the second airframe ID.

15 Claims, 16 Drawing Sheets

(56) References Cited

U.S. PATENT DOCUMENTS

| | | | |
|---|---|---|---|
| 2014/0172287 | A1 | 6/2014 | Ando et al. |
| 2018/0046856 | A1 | 2/2018 | Kapczynski |
| 2019/0149322 | A1* | 5/2019 | Bar-Nahum .......... H04W 12/06 380/278 |
| 2020/0166929 | A1* | 5/2020 | Jiwani .................. G05D 1/0022 |
| 2021/0037355 | A1 | 2/2021 | Brown et al. |
| 2022/0343241 | A1* | 10/2022 | Jha ......................... G08G 1/166 |
| 2023/0156554 | A1* | 5/2023 | Ferdi ........................ G08G 5/26 370/331 |

FOREIGN PATENT DOCUMENTS

| | | | |
|---|---|---|---|
| EP | 3679733 | A1 | 7/2020 |
| JP | 2014-082790 | A | 5/2014 |
| JP | 2014-195143 | A | 10/2014 |
| JP | 2017-151839 | A | 8/2017 |
| JP | 2018-166309 | A | 10/2018 |
| JP | 6686242 | B1 | 4/2020 |
| JP | 2020-090396 | A | 6/2020 |
| JP | 2020-164161 | A | 10/2020 |
| WO | 2015/043813 | A1 | 4/2015 |
| WO | 2017/145398 | A1 | 8/2017 |
| WO | 2019/042262 | A1 | 3/2019 |
| WO | 2019/048857 | A1 | 3/2019 |
| WO | 2019/146085 | A1 | 8/2019 |

OTHER PUBLICATIONS

Extended European Search Report for EP Application No. 21922866.5, dated on Feb. 27, 2024.

Chinese Office Action for CN Application No. 202180092201.7 mailed on Sep. 24, 2025 with English Translation.

Luo Wenjun, Gao Yifeng, Location-based Identity Authentication, Journal of Jilin University (Engineering Edition), No. S1, Sep. 15, 2012.

* cited by examiner

| MINUTES AFTER START OF FLIGHT | AIRFRAME ID |
|---|---|
| 0 | #0 |
| 10 | #1 |
| 20 | #2 |
| 30 | #3 |

Fig. 2

| AUTHORITY LEVEL | INFORMATION ABOUT FLYING OBJECT |
|---|---|
| 3 | PERSONAL INFORMATION ABOUT USER |
| 2 | FLIGHT PATH, REMAINING BATTERY LEVEL |
| 1 | DESTINATION |

Fig. 12

FLYING OBJECT, AIR TRAFFIC CONTROL SYSTEM, METHOD FOR IDENTIFYING FLYING OBJECT, AND COMPUTER READABLE MEDIUM

This application is a National Stage Entry of PCT/JP2021/003129 filed on Jan. 29, 2021, the contents of all of which are incorporated herein by reference, in their entirety.

TECHNICAL FIELD

The present disclosure relates to a flying object, an air traffic control system, a method for identifying a flying object, and a computer readable medium.

BACKGROUND ART

In recent years, research and development of flying objects such as flying cars has become active. For example, Patent Literature 1 discloses a flying vehicle operation system under the control of an air traffic control system that controls operations of flying vehicles. In the flying vehicle operation system, the operations of flying vehicles from takeoff in a first takeoff and landing zone to takeoff and landing in a second takeoff and landing zone are automatically performed.

CITATION LIST

Patent Literature

Patent Literature 1: Japanese Unexamined Patent Application Publication No. 2017-151839

SUMMARY OF INVENTION

Technical Problem

As the number of flying objects increases in the future, the density of flying objects in the air will increase, increasing the risk of a collision between two flying objects. For safe flights, it is necessary for the flying objects to fly while communicating with an air traffic control system. In order for the air traffic control system to identify the flying objects, it is necessary for each of the flying objects to transmit an airframe ID, which is airframe identification information, in the same way as aircrafts do.

On the other hand, since anyone can identify the flying object by receiving the airframe ID transmitted by the flying object, security risks increase.

The present disclosure has been made to solve such a problem and an object thereof is to provide a flying object, an air traffic control system, a method for identifying the flying object, and a computer readable medium that can improve security of the flying object.

Solution to Problem

A flying object according to the present disclosure includes:

an airframe ID control unit configured to hold an airframe ID of the flying object changed according to a predetermined change pattern; and a communication unit configured to transmit the airframe ID.

An air traffic control system according to the present disclosure includes:

a communication unit configured to acquire a first airframe ID and position information transmitted from a flying object; and an identification unit configured to identify the flying object using the first airframe ID, wherein when the communication unit acquires a second airframe ID different from the first airframe ID after acquiring the first airframe ID, the identification unit determines whether or not the second airframe ID indicates the flying object based on a change between the position information at the time of acquiring the first airframe ID and the position information at the time of acquiring the second airframe ID.

A method for identifying a flying object according to the present disclosure includes:

acquiring a first airframe ID and position information transmitted from the flying object; and identifying the flying object using the first airframe ID, wherein when a second airframe ID different from the first airframe ID is acquired after acquiring the first airframe ID, it is determined whether or not the second airframe ID indicates the flying object based on a change between the position information at the time of acquiring the first airframe ID and the position information at the time of acquiring the second airframe ID.

A computer readable medium according to the present disclosure stores a program for causing a computer to execute processing of:

acquiring a first airframe ID and position information transmitted from the flying object; and identifying the flying object using the first airframe ID, wherein when a second airframe ID different from the first airframe ID is acquired after acquiring the first airframe ID, it is determined whether or not the second airframe ID indicates the flying object based on a change between the position information at the time of acquiring the first airframe ID and the position information at the time of acquiring the second airframe ID.

Advantageous Effects of Invention

According to the present disclosure, it is possible to provide a flying object, an air traffic control system, a method for identifying the flying object, and a computer readable medium that can improve security of the flying object.

BRIEF DESCRIPTION OF DRAWINGS

FIG. 2 shows an example of an airframe ID table according to the first example embodiment;

FIG. 12 shows a correspondence between authority levels and flying object information according to the fourth example embodiment;

EXAMPLE EMBODIMENT

Hereinafter, specific example embodiments to which the present disclosure is applied will be described in detail with reference to the drawings. However, the present disclosure is not limited to the following example embodiments. In addition, the following descriptions and drawings have been simplified as appropriate for clarity of the descriptions.

First Example Embodiment

Figure 1:
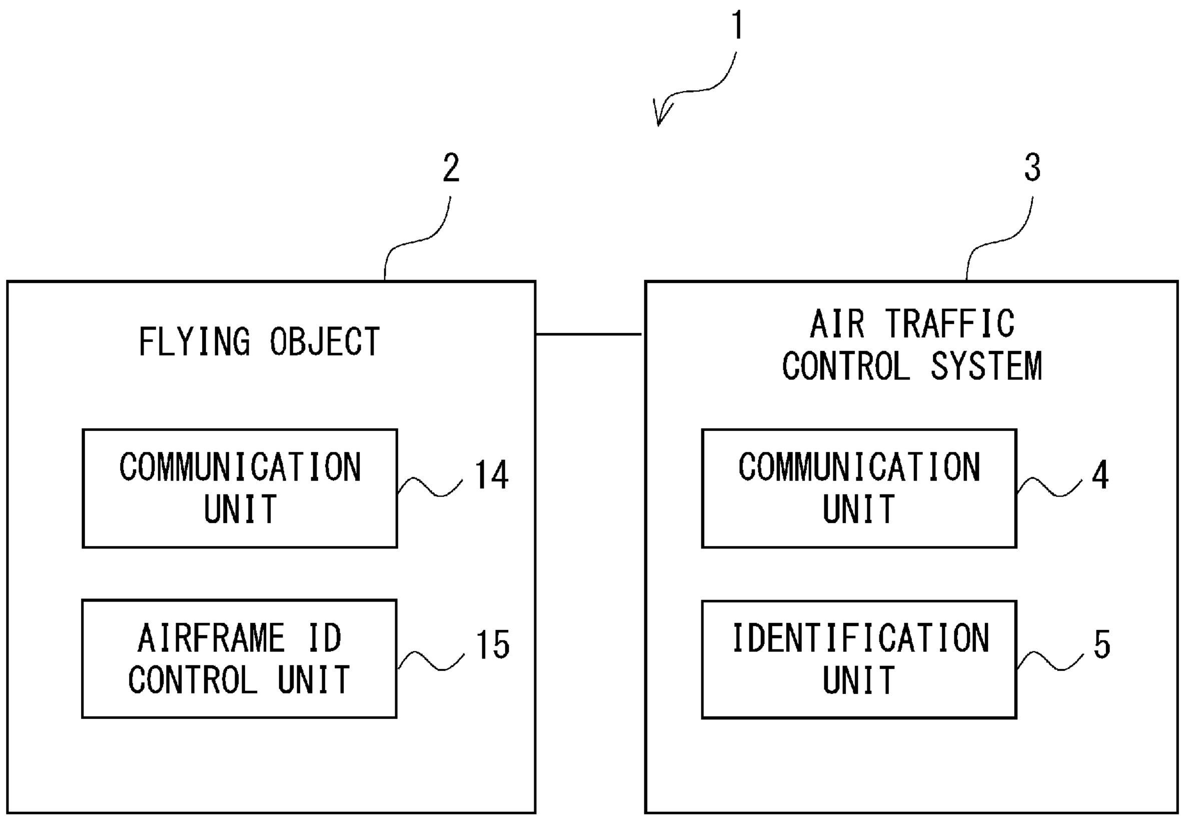
FIG. 1 is a block diagram showing a configuration of a flying object identification system according to a first example embodiment.

FIG. 1 is a block diagram showing a configuration of a flying object identification system 1 according to a first example embodiment. The flying object identification system 1 includes a flying object 2 and an air traffic control system 3.

The flying object 2 is, for example, a rotorcraft with a rotary wing, such as a drone, an Unmanned Aerial Vehicle (UAV), a flying car, a Vertical Take-Off and Landing Aircraft (VTOL), etc. The flying object 2 generates lift and thrust by rotationally driving the rotary wing. The flying object 2 may be an unmanned aircraft carrying luggage or the like or a manned aircraft with a passenger on board.

The flying object 2 has an airframe ID as its own airframe identification information. Different flying objects 2 have different airframe IDs, and no flying object 2 has the same airframe ID. The flying object 2 has a communication unit 14 and an airframe ID control unit 15. The communication unit 14 and the airframe ID control unit 15 may be software or modules in which processing is performed by a processor executing programs stored in a memory. Alternatively, the communication unit 14 and the airframe ID control unit 15 may be hardware such as circuits or chips.

The communication unit 14 transmits the airframe ID. The communication unit 14 communicates wirelessly with the ground side, that is, with the air traffic control system 3. The communication unit 14 communicates wirelessly with the air traffic control system 3 according to a frequency, a transmission output, and so on which are predetermined with the air traffic control system 3. For example, the communication unit 14 may perform processing in accordance with communication standards defined by the 3rd Generation Partnership Project (3GPP) such as 5G and 4G, or may perform processing in accordance with communication standards such as Wi-Fi (registered trademark) and Bluetooth (registered trademark). The communication unit 14 transmits radio signals to the air traffic control system 3. The communication unit 14 receives the radio signals from the air traffic control system 3. In this way, data and information can be transmitted and received between the flying object 2 and the air traffic control system 3. The communication unit 14 transmits the airframe ID and position information about the flying object 2 to the air traffic control system 3.

In addition, the communication unit 14 can transmit the airframe ID not only to the air traffic control system 3 but also to communication terminals such as smartphones. In this case, the airframe ID transmitted by the flying object 2 can be acquired by, for example, installing a predetermined application on the smartphones. In addition, the communication unit 14 can transmit the airframe ID of the corresponding flying object 2 to other flying objects 2, receive the airframe ID from the other flying objects 2, and transmit and receive the airframe ID between the flying objects 2.

The airframe ID control unit 15 controls the change and transmission of the airframe ID. The airframe ID control unit 15 holds the airframe ID of the corresponding flying object 2, which is changed according to a predetermined change pattern. The airframe ID may be changed, for example, every predetermined time or at a specified timing, and the timing of the change of the airframe ID can be set at a timing desired by a user or the like. For example, the airframe ID may be changed when the number of flights increases or after a plurality of flights.

For example, as the predetermined change pattern, the airframe ID control unit 15 may create a plurality of the airframe IDs in advance as described in the airframe ID table in FIG. 2, and then change the airframe ID every predetermined time. The communication unit 14 may transmit the airframe ID table stored in the airframe ID control unit 15 to the air traffic control system 3. In this manner, the airframe ID control unit 15 can share the change pattern of the airframe ID with the air traffic control system 3 that controls the flights of the corresponding flying object 2. Alternatively, the communication unit 14 may receive the airframe ID table from the air traffic control system 3. As a result, the change pattern of the airframe ID of the flying object 2 is shared between the flying object 2 and the air traffic control system 3.

In the airframe ID table shown in FIG. 2, the airframe ID at the start of the flight (0 minutes after the start of the flight) is #0, the airframe ID at 10 minutes after the start of the flight is #1, the airframe ID at 20 minutes after the start of the flight is #2, and the airframe ID at 30 minutes after the start of the flight is #3. Note that the airframe ID table in FIG. 2 is an example, and any airframe ID may be generated. For example, the airframe ID control unit 15 or the air traffic control system 3 may generate an airframe ID using an algorithm or a random number generation function. The airframe ID may be a randomly generated ID or an ID that is changed according to at least one of the number of flights and a duration of each of the flights of the flying object 2.

The flying object 2 flies according to a predetermined flight plan while communicating wirelessly with the air traffic control system 3. The flying object 2 can fly autonomously along a flight path from a takeoff site to a landing site. For example, the flying object 2 takes off from a takeoff and landing facility and flies along the flight path based on the flight plan. When the flying object 2 flies to the landing site corresponding to the destination, it lands at the landing site. The flight path is a three-dimensional path from the takeoff site to the landing site. Pre-specified takeoff and landing facilities may be used as the takeoff and landing sites. The takeoff and landing sites may be any location as long as there is room for landing. Of course, the takeoff and landing site to take off and land may be the same location.

The control of the flying object 2 can be switched between autopilot or manual control by a pilot. For example, in areas with many obstacles, such as urban areas, the flying object 2 can be configured to operate on autopilot and switch to manual control in an emergency, because the pilot is required to have advanced control skills.

The air traffic control system 3 is a flight management and control system. The air traffic control system 3 is a hardware apparatus (computer apparatus) for the flight management and air traffic control of the flying object 2 and is installed in a flight management center. The air traffic control system 3 is not limited to a single physical apparatus, for example, and instead a plurality of processors may cooperate to perform the processing described later.

In addition, an air traffic control center communicating with a plurality of flight management centers may be provided with the air traffic control system 3 to control a wide area. In this way, the air traffic control system 3 of the flight management center and the air traffic control system 3 of the air traffic control center communicate with each other to control the flying object 2 over a wide area.

The air traffic control system 3 has a communication unit 4 and an identification unit 5. The communication unit 4 and the identification unit 5 may be software or modules in which processing is performed by the processor executing programs stored in a memory. Alternatively, the communication unit 4 and the identification unit 5 may be hardware such as a circuit or a chip.

The communication unit 4 acquires the airframe ID and the position information about the flying object 2 transmitted from the flying object 2. The communication unit 4 also acquires the airframe ID and the position information about the flying object 2 at different timings.

The identification unit 5 identifies the flying object 2 using the airframe ID received from the flying object 2. For example, the identification unit 5 may be configured to previously hold a table in which the airframe ID and the flying object are associated and to extract the flying object associated with the received airframe ID by referring to the table.

Here, the communication unit 4 may acquire different airframe IDs from the flying object 2 at different timings. In this case, the identification unit 5 determines whether the airframe ID different from a first airframe ID indicates the flying object 2 associated with the first airframe ID based on a change between the position information acquired together with the first airframe ID and the position information acquired together with the airframe ID different from the first airframe ID. The change in the position information may be indicated by using, for example, a distance between the position information acquired at different timings. For example, the identification unit 5 may determine that when the change in the position information is within a predetermined range, an airframe ID different from the first airframe ID indicates the flying object 2 associated with the first airframe ID.

Figure 3:
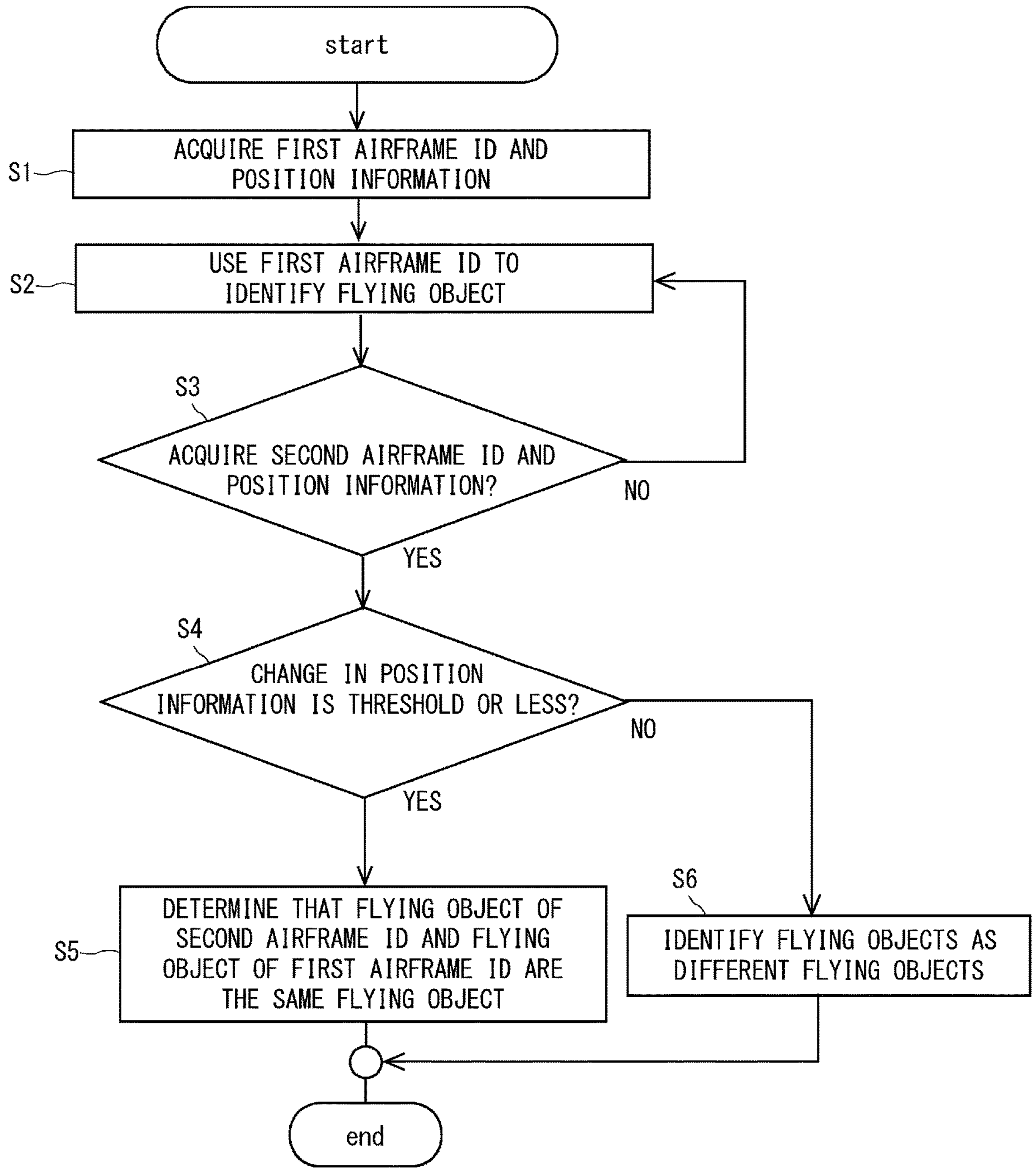
FIG. 3 is a flowchart showing an operation of an air traffic control system according to the first example embodiment.

The operation of the air traffic control system 3 according to the first example embodiment is described below with reference to FIG. 3. FIG. 3 is a flowchart showing an operation of the air traffic control system 3 according to the first example embodiment.

First, the communication unit 4 acquires the first airframe ID and the position information about the flying object 2 (S1). In order to distinguish the airframe IDs from each other, the initial airframe ID is referred to as a first airframe ID, and the changed airframe ID is referred to as a second airframe ID. Next, the identification unit 5 uses the first airframe ID to identify the flying object 2 (S2). After that, the air traffic control system 3 communicates with the flying object 2 transmitting the first airframe ID to perform the flight management and air traffic control of the flying object 2.

After that, when the communication unit 4 has not acquired the second airframe ID and the position information about the flying object 2 transmitting the second airframe ID (S3, NO), the air traffic control system 3 continues to perform the flight management and air traffic control of the flying object 2 transmitting the first airframe ID identified by the identification unit 5.

On the other hand, when the communication unit 4 acquires the second airframe ID and the position information about the flying object 2 transmitting the second airframe ID (S3, YES), the identification unit 5 determines whether the flying object 2 transmitting the second airframe ID is identical to the flying object 2 transmitting the first airframe ID, based on the change between the position information obtained at the time of acquiring the first airframe ID and the position information obtained at the time of acquiring the second airframe ID. For example, the identification unit 5 determines whether the change between the position information obtained at the time of acquiring the first airframe ID and the position information obtained at the time of acquiring the second airframe ID is less than or equal to a threshold (S4). When the distance between the position information acquired at different timings is less than or equal to a preset threshold (e.g., 50 m) (S4, YES), the identification unit 5 determines that the flying object 2 transmitting the second airframe ID and the flying object 2 transmitting the first airframe ID are the same flying object 2 (S5).

When the distance between position information acquired at different timings is greater than the preset threshold (S4, NO), the identification unit 5 identifies the flying object 2 transmitting the second airframe ID as a flying object 2 different from the flying object 2 transmitting the first airframe ID (S6). The air traffic control system 3 identifies the flying object 2 transmitting the first airframe ID and the flying object 2 transmitting the second airframe ID as different flying objects 2, and performs the flight management and air traffic control.

As explained above, the flying object 2 according to the first example embodiment can improve security by changing the airframe ID. On the other hand, if the flying object 2 freely changes the airframe ID, the air traffic control system 3 can no longer identify the flying object 2, which could result in loss of flight safety. On the other hand, the air traffic control system 3 according to the first example embodiment can identify the flying object 2 by using the position information about the flying object 2, even if different airframe IDs are acquired at different timings. As a result, the air traffic control system 3 can identify or specify the flying object 2 whose airframe ID to be transmitted are changed in consideration of security.

Second Example Embodiment

Figure 4:
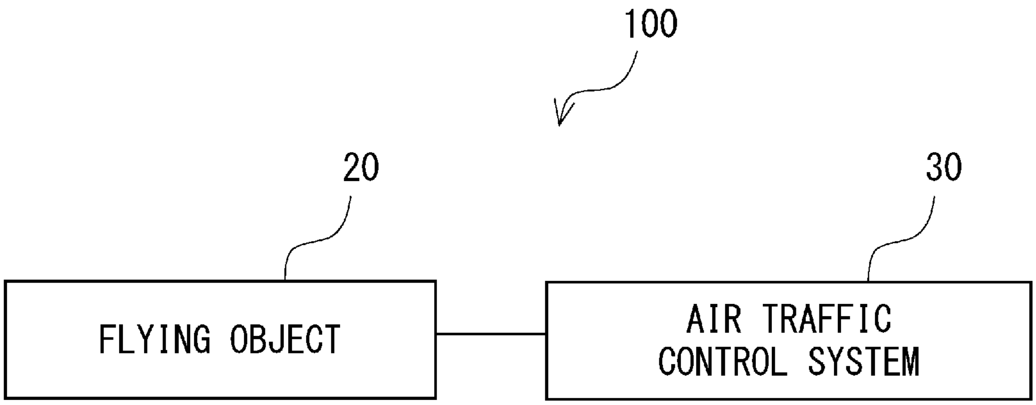
FIG. 4 is a block diagram showing a configuration of a flying object identification system according to a second example embodiment.

FIG. 4 is a block diagram showing a configuration of a flying object identification system 100 according to a second example embodiment. The flying object identification system 100 includes a flying object 20 and an air traffic control system 30.

Figure 5:
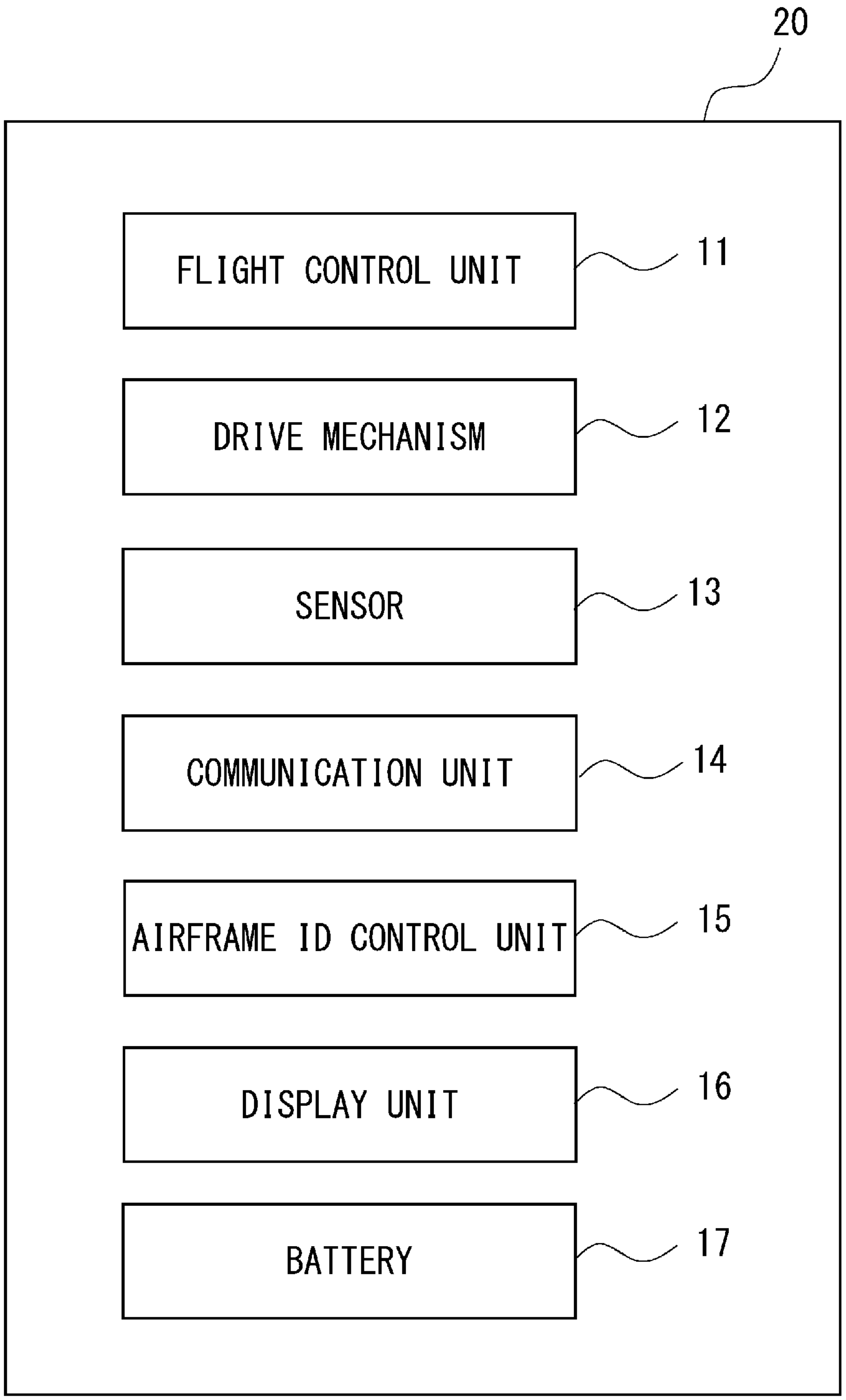
FIG. 5 is a block diagram showing a configuration of a flying object according to the second example embodiment.

FIG. 5 is a block diagram showing the configuration of the flying object 20 according to the second example embodiment. The flying object 20 includes a flight control unit 11, a drive mechanism 12, a sensor 13, a communication unit 14, an airframe ID control unit 15, a display unit 16, and a battery 17. In the flying object 20 according to the second example embodiment, components similar to those according to the first example embodiment are denoted by the same signs, and detailed descriptions thereof are omitted as appropriate.

The flight control unit 11 controls each component constituting the flying object 20. The drive mechanism 12 includes a rotary wing and its motor, and generates lift and thrust for flying. The flight control unit 11 outputs a driving signal for controlling the drive mechanism 12. For example, when the flying object 20 has a plurality of rotary wings, the flight control unit 11 controls the drive mechanism 12 so that the drive mechanism 12 drives the rotary wings independently.

The flight control unit 11 stores the flight plan in a memory or the like. The flight control unit 11 may store the flight plan received from the air traffic control system 30 in the memory or may store the flight plan input from the user of the flying object 20 in the memory. In the case of autopilot, the flight control unit 11 controls the drive mechanism 12 to fly according to the flight plan. When the position of the flying object 20 moves away from the flight path due to wind or other factors, the flight control unit 11 controls the drive mechanism 12 so that the flying object 20 approaches the flight path. The flight control unit 11 can detect the position of the flying object 20 by using the sensor 13. The flight control unit 11 controls the drive mechanism 12 based on a result of the detection by the sensor 13.

The sensor 13 detects information about a flight state of the flying object 20. The sensor 13 has, for example, a gyroscopic sensor for detecting an attitude of the airframe and a position sensor for detecting a position of the airframe. As the position sensor, for example, a satellite positioning sensor such as GPS (Global Positioning System) can be used. The flight control unit 11 identifies the position of the corresponding flying object based on the information acquired by the sensor 13. Specifically, the flight control unit 11 identifies a three-dimensional position of the flying object 20 based on, for example, positioning information received by the sensor 13 from a plurality of satellites. The communication unit 14 transmits the position information related to the airframe ID and the position identified by the flight control unit 11. It should be noted that the number of the sensors 13 is not limited to one, but may be plural.

The flying object 20 may be provided with the display unit 16 that indicates to passengers a flight status, a congestion status during the flight, airframe information, etc. The contents displayed on the display unit 16 may be changed according to the information about the flying object 20. For example, the contents displayed on the display unit 16 may be changed according to the information about whether the flying object 20 is a manned aircraft or an unmanned aircraft. Alternatively, the contents displayed on the display unit 16 may be changed according to whether the flying object 20 is in automatic or manual operation. If the flying object 20 is an unmanned aircraft, the display unit 16 may be omitted. The battery 17 supplies power to each device constituting the flying object 20.

With the above components, the flying object 20 can fly while communicating with the air traffic control system 30.

Figure 6:
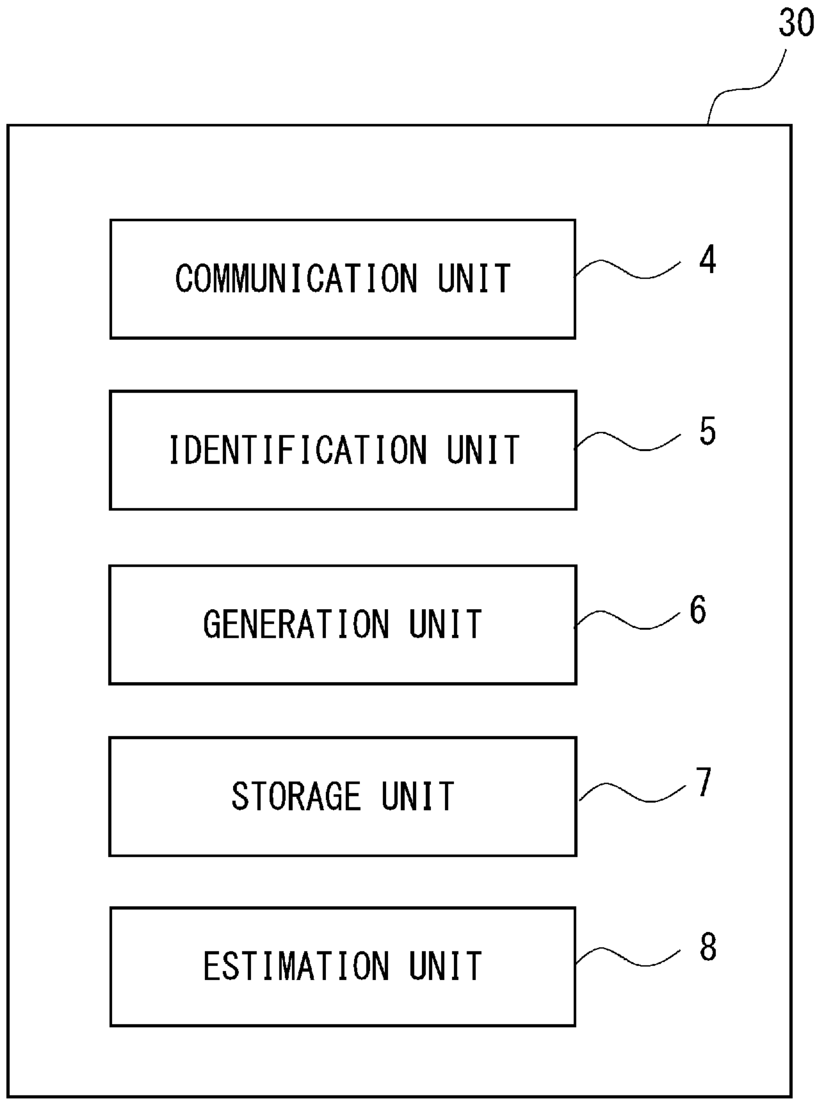
FIG. 6 is a block diagram showing a configuration of an air traffic control system according to the second example embodiment.

FIG. 6 is a block diagram of the air traffic control system 30 according to the second example embodiment. The air traffic control system 30 includes a communication unit 4, an identification unit 5, a generation unit 6, a storage unit 7, and an estimation unit 8. In the air traffic control system 30 according to the second example embodiment, components similar to those according to the first example embodiment are denoted by the same signs, and detailed descriptions thereof are omitted as appropriate.

The communication unit 4 communicates wirelessly with the flying object 20 to acquire airframe information including the airframe ID and the position information about the flying object 20. The airframe information may include performance information related to the performance of the flying object 20. The performance information includes data related to the weight, size, flyable duration, turning ability, wind resistance, flying speed, and flight altitude of the flying object 20. The performance information may include data related to a remaining battery level and a remaining fuel level during flight. The performance information may further include information indicating whether the flying object 20 is a manned or unmanned aircraft. The airframe information may include information indicating whether the flying object 20 is an emergency airframe such as police, fire, or ambulance airframe.

The communication unit 4 communicates wirelessly with the flying object 20 according to a frequency, transmission power, and the like which are predetermined with the flying object 20. For example, the communication unit 4 may perform processing in accordance with communication standards defined by 3GPP such as 5G and 4G, or may perform processing in accordance with communication standards such as Wi-Fi (registered trademark) and Bluetooth (registered trademark). The communication unit 4 transmits radio signals to the flying object 20. The communication unit 4 receives the radio signals from the flying object 20. In this way, data and information can be transmitted and received between the flying object 20 and the air traffic control system 30.

The generation unit 6 generates a flight plan including a flight path and a flight schedule based on a scheduled takeoff time of the flying object 20 acquired by the communication unit 4 and movement information related to the destination. The scheduled takeoff time may be the current time or a pre-scheduled registered time. The scheduled takeoff time and destination may be information input directly to the air traffic control system 30 by the user of the flying object 20 or a user of the air traffic control system 30. The destination may be a place name, a facility name, an address, coordinates (latitude and longitude), or the like. Alternatively, the destination may be an ID or the like of the takeoff and landing facility itself, and the movement information may include a transit port between the takeoff and landing sites.

The flight path is a movement path from the takeoff site to the landing site corresponding to the destination. The flight path is information indicating a trajectory of a target position that the flying object 20 passes through. Furthermore, in the flight path, the scheduled flight time may be associated with each target position. The flight path may be, for example, a set of three-dimensional coordinates indicating the target positions. Specifically, the flight path may be data in which three-dimensional coordinates are arranged along a time series. By connecting the three-dimensional coordinates, a flight path is generated.

The generation unit 6 may generate a flight path based on the performance information. For example, the generation unit 6 generates a flight path so as to satisfy performance indicated by the performance information. The performance information is the weight, size, flyable duration, turning ability, wind resistance, flying speed, and flight altitude of the flying object 20. The performance information may include a current remaining battery level and a current remaining fuel level. For example, if the power is from an electric motor, the remaining battery level is included in the performance information, whereas if the power is from an internal combustion engine, a remaining level of fuel, such as gasoline, is included in the performance information.

Alternatively, when a fuel cell is used as the battery 17, a remaining level of fuel, such as hydrogen, is included in the performance information. When an internal combustion engine and an electric motor are used together as power, both the remaining battery level and the remaining fuel level may be included in the performance information.

When the flyable duration is included as the performance information, for example, the generation unit 6 generates a flight path so that the flyable duration is not exceeded. Specifically, for a flying object 20 with a short flyable duration, the generation unit 6 reduces a flight distance and generates a flight path so that the flyable duration is not exceeded. Obviously, the generation unit 6 can generate a flight path so as to satisfy performances other than the flyable duration. The communication unit 4 transmits the generated flight plan to the flying object 20.

The storage unit 7 stores the airframe information acquired from the flying object 20 and the flight plan generated by the generation unit 6. The storage unit 7 also stores the airframe ID table indicating the change pattern of the airframe ID transmitted by the flying object 20.

Even if the airframe ID of the flying object 20 is changed, the identification unit 5 identifies the flying object 20 associated with the acquired airframe ID based on the airframe ID table stored in the storage unit 7 in addition to a change between the position information acquired at different timings. The identification unit 5 may also identify the flying object 20 by referring to the flight plan in addition to the airframe ID and the position information. The identification unit 5 can enhance the accuracy of identifying the flying object 20 by comparing the position information about the flying object 20 with the flight plan of the flying object 20.

When the radio communication between the air traffic control system 30 and the flying object 20 is disconnected, the estimation unit 8 estimates the position of the flying object 20 in flight based on the position information about the flying object 20 at the time of the communication disconnection and the flight plan. For example, the estimation unit 8 calculates the speed and direction of the flying object 20 from the position information until the time of the communication disconnection, and estimates the position of the flying object 20 using the flight path and the flight schedule of the flight plan after the time of the communication disconnection.

When the communication is restored, the identification unit 5 identifies the flying object 20 by comparing the airframe ID of the flying object 20 at the estimated position with the airframe ID based on the airframe ID table.

Furthermore, the identification unit 5 identifies the flying object 20 by comparing the position of the flying object 20 when the communication is restored with the estimated position of the flying object 20 at the timing when the communication is restored.

Figure 7:
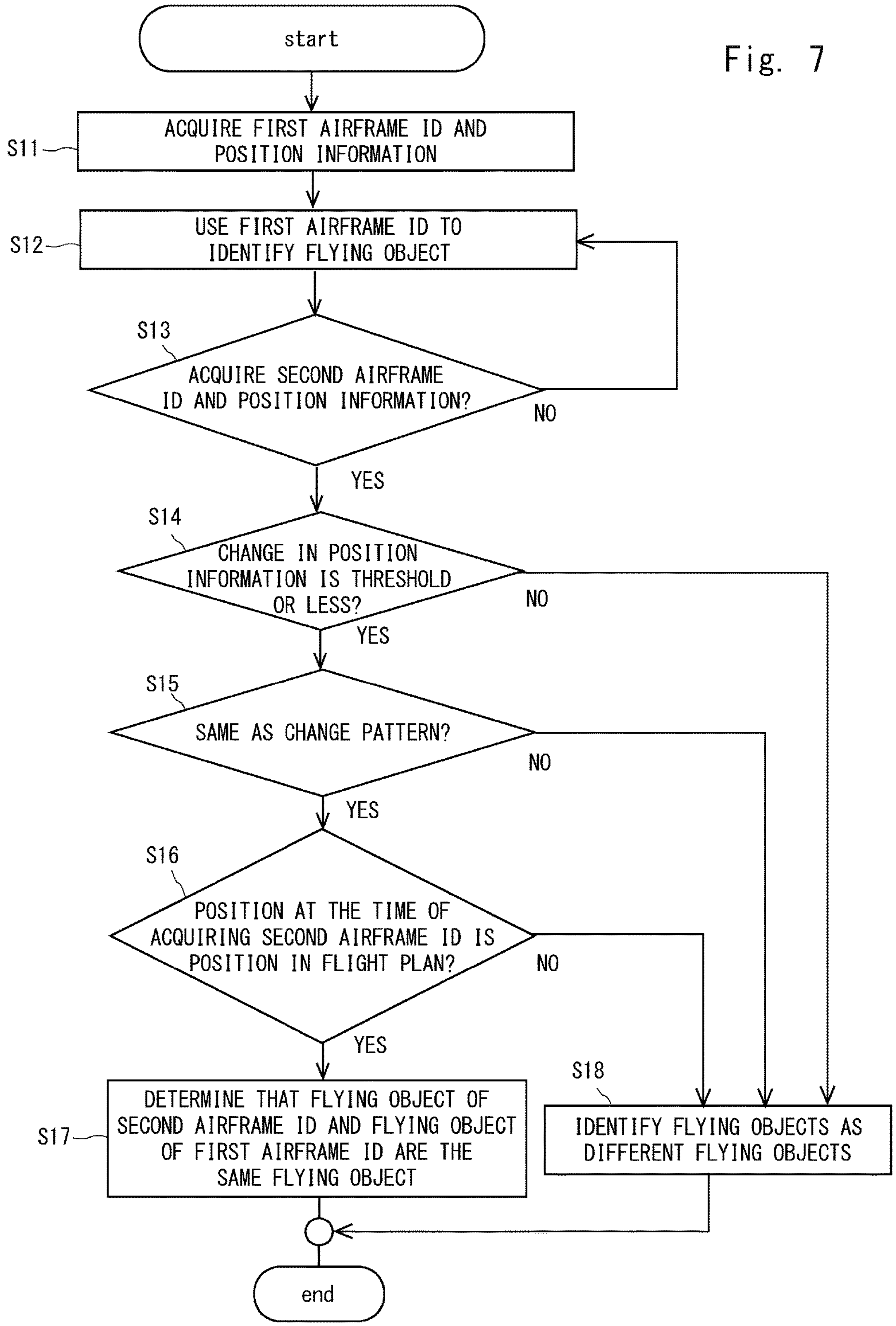
FIG. 7 is a flowchart showing an operation of the air traffic control system according to the second example embodiment.

FIG. 7 is a flowchart showing an operation of the air traffic control system 30 according to the second example embodiment. Since S11 to S14 in FIG. 7 are the same as S1 to S4 in FIG. 3, respectively, descriptions thereof are omitted. As in FIG. 3, in order to distinguish the airframe IDs from each other, the initial airframe ID is referred to as a first airframe ID, and the changed airframe ID is referred to as a second airframe ID.

If the change between the position information at the time of acquiring the first airframe ID and the position information at the time of acquiring the second airframe ID is equal to or less than a threshold (S14, YES), the identification unit 5 refers to the change pattern of the airframe ID stored in the storage unit 7. When the change between the position information is equal to or less than the threshold, it means that an amount of change between the position information is equal to or less than the threshold. The identification unit 5 determines whether the second airframe ID is the same as the airframe ID identified by the change pattern of the airframe ID of the flying object 20 that has transmitted the first airframe ID (S15).

If the second airframe ID is different from the airframe ID identified by the change pattern (S15, NO), the identification unit 5 identifies the flying object that is transmitting the second airframe ID as a flying object 20 different from the flying object 20 that has transmitted the first airframe ID (S18). When the second airframe ID is the same as the airframe ID identified by the change pattern (S15, YES), the identification unit 5 refers to the flight plan stored in the storage unit 7 and determines whether the position at the time of acquiring the second airframe ID is the position in the flight plan of the flying object 20 that has been transmitting the first airframe ID (S16). When the position at the time of acquiring the second airframe ID is not present in the flight plan (S16, NO), the identification unit 5 identifies the flying object as a different flying object 20 (S18). When the position at the time of acquiring the second airframe ID is present in the flight plan (S16, YES), the identification unit 5 determines that the flying object 20 that is transmitting the second airframe ID and the flying object 20 that has been transmitting the first airframe ID are the same flying object 20 (S17). Although it is shown in FIG. 7 that the processing is performed in the order of Steps S14, S15, and S16, the order of Steps S14, S15, and S16 may be changed. For example, the air traffic control system 30 may perform the processing of Step S15 and then perform the processing of Step S14 or S16, or may perform the processing of Step S16 and then perform the processing of Step S14 or S15.

Figure 8:
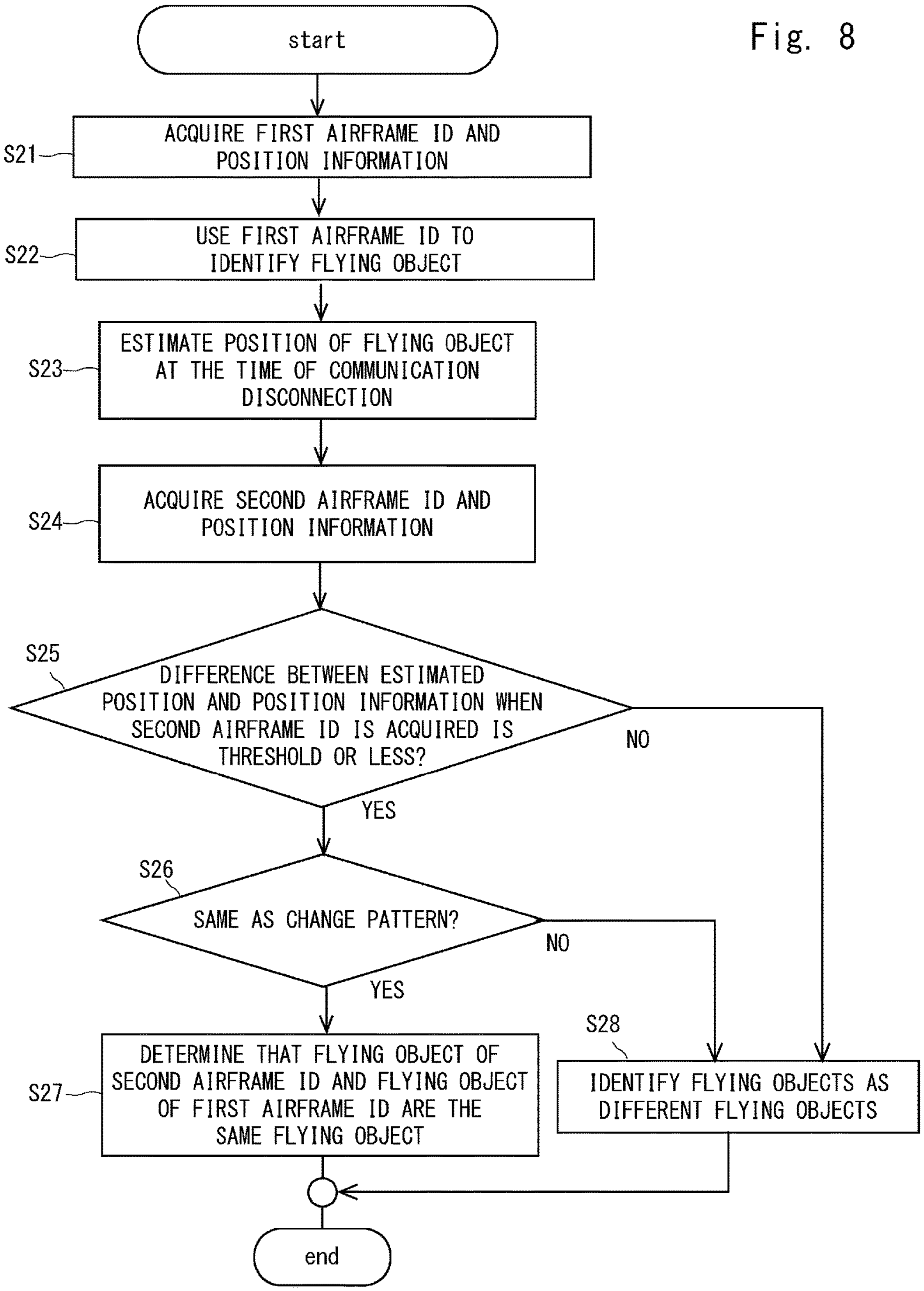
FIG. 8 is a flowchart showing the operation of the air traffic control system according to the second example embodiment.

FIG. 8 is a flowchart showing an operation of the air traffic control system 30 when communication with the flying object 20 is restored. Since S21 to S22 in FIG. 8 are the same as S1 to S2 in FIG. 3, respectively, descriptions thereof are omitted. As in FIG. 3, in order to distinguish the airframe IDs from each other, the initial airframe ID is referred to as a first airframe ID, and the changed airframe ID is referred to as a second airframe ID.

When the communication between the communication unit 4 and the flying object 20 is disconnected, the estimation unit 8 estimates the position of the flying object 20 in flight based on the position information about the flying object 20 at the time of the communication disconnection and the flight plan stored in the storage unit 7 (S23). For example, when the communication unit 4 does not receive a radio signal from the flying object 20 for a predetermined period of time, or when a response signal to the radio signal transmitted by the communication unit 4 is not received, the estimation unit 8 may determine that the communication between the communication unit 4 and the flying object 20 has been disconnected. When the communication is restored, and the communication unit 4 acquires the first airframe ID, the identification unit 5 uses the first airframe ID to identify the flying object 20.

On the other hand, when the communication is restored, and the communication unit 4 acquires the second airframe ID and position information (S24), the identification unit 5 compares the position of the flying object 20 estimated by the estimation unit 8 with the position information when the second airframe ID is acquired. When the difference between the estimated position and the position when the second airframe ID is acquired is greater than a threshold (S25, NO), the identification unit 5 identifies the flying object as a different flying object 20 (S28).

When the difference between the estimated position and the position when the second airframe ID is acquired is equal to or less than the threshold (S25, YES), the identification unit 5 refers to the change pattern of the airframe ID stored in the storage unit 7. The identification unit 5 determines whether the second airframe ID is the same as the airframe ID identified by the change pattern of the airframe ID of the flying object 20 that has been transmitting the first airframe ID (S26). If the second airframe ID is different from the airframe ID identified by the change pattern (S26, NO), the identification unit 5 identifies the flying object 20 that is transmitting the second airframe ID as a flying object 20 different from the flying object 20 that has transmitted the first airframe ID (S28). When the second airframe ID is the same as the airframe ID identified by the change pattern (S26, YES), the identification unit 5 determines that the flying object 20 that is transmitting the second airframe ID and the flying object 20 that has been transmitting the first airframe ID are the same flying object 20 (S27). Although it is shown in FIG. 8 that the processing is performed in the order of Steps S25 and S26, the order of Steps S25 and S26 may be changed. For example, the air traffic control system 30 may perform the processing of Step S26 and then perform the processing of Step S25.

As described above, the air traffic control system 30 according to the second example embodiment can identify the flying object 20 by using the change between the position information about the flying object 20, the change pattern 20 of the airframe ID, and the flight plan. Furthermore, even if the airframe ID of the flying object 20 is changed when the communication with the flying object 20 is disconnected, the air traffic control system 30 can determine whether or not the second airframe ID indicates the flying object 20 by using a result of the comparison between the position information about the flying object 20 when the communication is restored and the estimated position, and the change pattern of the airframe ID. Thus, even if the flying object 20 changes the airframe ID to improve security, the air traffic control system 30 can identify the flying object 20.

Third Example Embodiment

Figure 9:
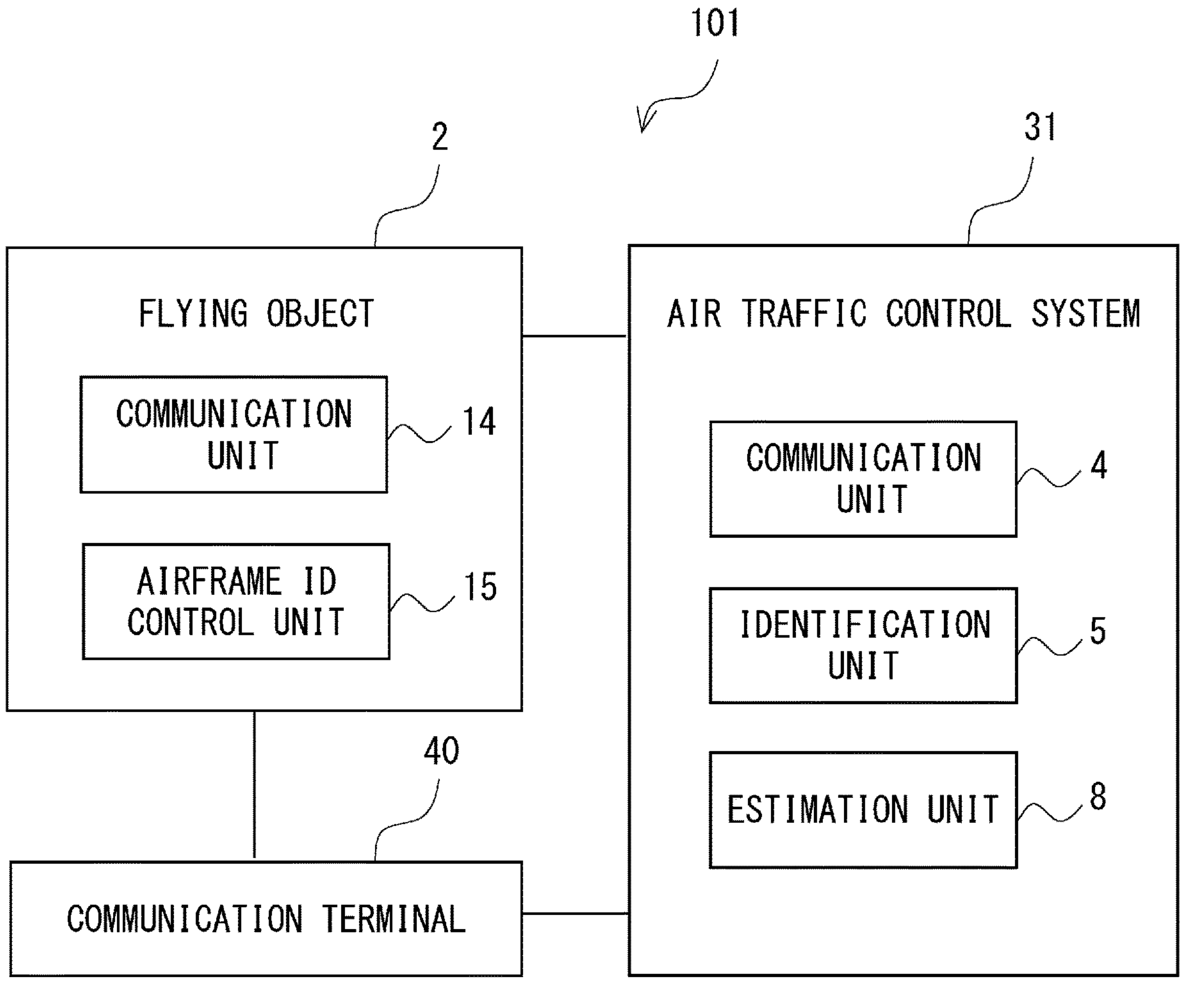
FIG. 9 is a block diagram showing a configuration of a flying object identification system according to a third example embodiment.

The flying object identification system 101 according to a third example embodiment is described with reference to FIG. 9. The flying object identification system 101 according to the third example embodiment includes a flying object 2, an air traffic control system 31, and a communication terminal 40. The flying object 2 includes a communication unit 14 and an airframe ID control unit 15. The air traffic control system 31 includes a communication unit 4, an identification unit 5, and estimation unit 8. The flying object identification system 101 according to the third example embodiment identifies the flying object 2 using the communication terminal 40. In the flying object identification system 101 according to the third example embodiment, components similar to those according to the first and second example embodiments are denoted by the same signs, and detailed descriptions thereof are omitted as appropriate.

The communication terminal 40 is, for example, a smartphone and has communication and photography functions. The communication terminal 40 can communicate with the air traffic control system 31. For example, the communication terminal 40 may communicate with the air traffic control system 31 via a mobile network managed by a communication provider or the Internet. A user of the communication terminal 40 can acquire information about the flying object 2 by transmitting an inquiry message including an image including the flying object 2 and the position information about the communication terminal 40 to the air traffic control system 31. For example, the user of the communication terminal 40 may capture an image including the flying object 2 and make an inquiry to the air traffic control system 31 when the flying object 2 is making noise or a suspicious flying object 2 is flying.

Moreover, the communication terminal 40 can acquire the airframe ID by directly communicating wirelessly with the flying object 2. A communication method such as Bluetooth (registered trademark) may be used for the wireless communication. For example, the communication terminal 40 may request an airframe ID from the flying object 2, and when a response from the flying object 2 cannot be obtained, it may determine the flying object 2 as a suspicious airframe and report to the police that a suspicious airframe is flying and staying around the position of the communication terminal 40.

The communication terminal 40 may transmit a message to the flying object 2 in addition to the airframe ID request. The message may include, for example, a content such that the flight is noisy or inquiry about the purpose of stay. When the communication terminal 40 receives a response from the flying object 2, it can acquire the circumstances such as a purpose of stay of the flying object 2. On the other hand, when the communication terminal 40 is unable to obtain a response from the flying object 2, it may determine the flying object 2 as a suspicious airframe and report to the police that a suspicious airframe is flying and staying around the position of the communication terminal 40.

When the communication unit 14 of the flying object 2 receives a request signal of the airframe ID from, for example, the air traffic control system 31, the communication terminal 40, or another flying object 2, it transmits a response signal including the airframe ID in response to the request. Whether or not the request for the airframe ID can be responded may be set in advance depending on a request source. Moreover, the user of the flying object 2 may decide whether or not the request for the airframe ID can be responded and a content of the response.

The communication unit 4 of the air traffic control system 31 receives, from the communication terminal 40, images including the flying object 2 captured by the communication terminal 40 and the position information about the communication terminal 40. The estimation unit 8 estimates the position of the flying object 2 using background information and the position information included in the received image. The estimation unit 8 identifies the position of the communication terminal 40 at the time of capturing the image from the position information about the communication terminal 40. Furthermore, the estimation unit 8 estimates the position of the flying object 2 in the vicinity of the position of the communication terminal 40 from the background information included in the received image. For example, the estimation unit 8 may estimate the position of a building, a steel tower, a mountain, a river, or the sea, which is the background information, using map information or the like. If a received background image includes landmarks whose positions are obvious, the estimation unit 8 may estimate the position of the flying object 2 from the background image without using the position information about the communication terminal 40. The estimation unit 8 may further estimate the position of the flying object 2 by estimating a distance between the flying object 2 and the background information in the image. In addition, the estimation unit 8 may use an imaging direction of the communication terminal 40, that is, an angle of the communication terminal 40 when the communication terminal 40 is held upward toward the sky to capture an image of the flying object 2, or the like, to estimate the position of the flying object 2. It should be noted that the communication unit 4 may also request, via a mobile network managed by a communication provider, from the communication terminal 40 present in a predetermined area, an image of the sky above the predetermined area or the position information about the communication terminal 40 that has captured the image.

The identification unit 5 identifies the flying object 2 using the estimated position of the flying object 2 estimated by the estimation unit 8. The identification unit 5 identifies the flying object 2 at the estimated position, for example, by comparing the position information about the flying object 2 under control with the estimated position. Specifically, when the distance between the position of the flying object 2 under control and the estimated position is shorter than a predetermined distance, the identification unit 5 may identify the flying object 2 at the estimated position as the flying object 2 under control.

The communication unit 4 transmits the information about the identified flying object 2 to the communication terminal 40. For example, the communication unit 4 transmits information such as the airframe ID, the airframe information, and the destination of the identified flying object 2 to the communication terminal. Thus, the user of the communication terminal 40 can acquire the information about the flying object 2. For example, the airframe ID of the flying object 2 may be associated in advance with the information such as airframe information and the destination.

The communication unit 4 may transmit a request signal to the flying object 2 requesting the airframe ID using a directional radio wave to the estimated position of the flying object 2 estimated by the estimation unit 8. When the communication unit 4 receives a response signal to the request signal, the identification unit 5 can identify the flying object 2 using the airframe ID included in the response signal. The identification unit 5 may refer to the storage unit 7 that stores the information about the flying object 2 and identify the flying object 2 corresponding to the airframe ID.

When the identification unit 5 cannot identify the airframe ID of the flying object 2, it determines that the flying object 2 at the estimated position is a suspicious flying object 2, and the communication unit 4 transmits, to the communication terminal 40, a message or the like indicating that the identification unit 5 identifies the flying object 2 as a suspicious flying object 2. At this time, the communication unit 4 may report to the police that a suspicious flying object 2 is flying and staying at the estimated position. The case where the communication unit 4 cannot identify the airframe ID of the flying object 2 may be, for example, the case where the airframe ID is not included in the response signal or the case where the flying object is not associated with the airframe ID included in the response signal.

Figure 10:
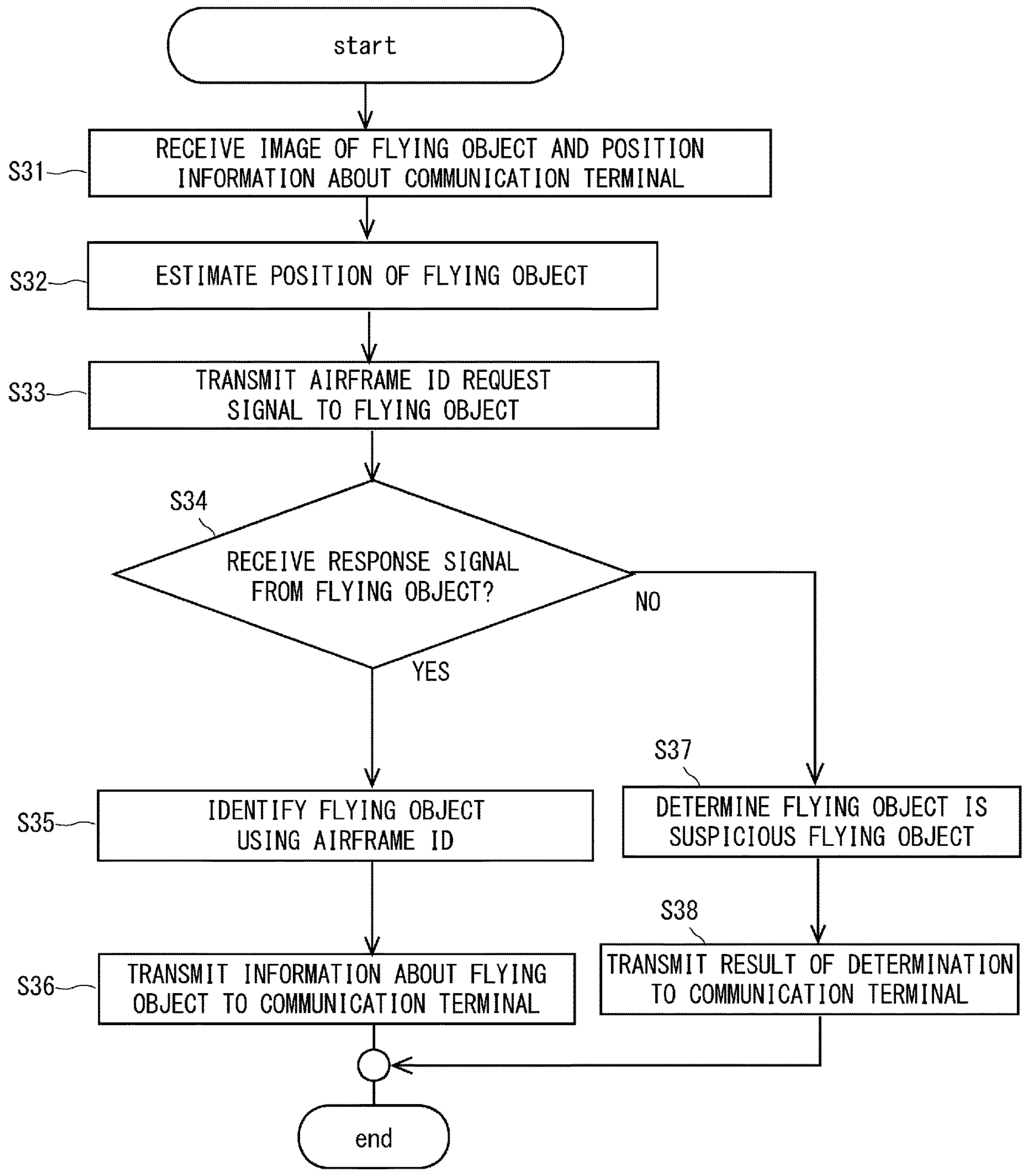
FIG. 10 is a flowchart showing an operation of an air traffic control system according to the third example embodiment.

FIG. 10 is flowchart showing an operation of the air traffic control system 31 according to the third example embodiment. The operation of the air traffic control system 31 is described below with reference to FIG. 10.

First, the communication unit 4 receives, from the communication terminal 40, an image including the flying object 2 captured by the communication terminal 40 and the position information about the communication terminal 40 (S31). The estimation unit 8 estimates the position of the flying object 2 using the background information and the position information included in the received image (S32). The communication unit 4 transmits a request signal to the flying object 2 requesting the airframe ID using a directional radio wave to the position of the flying object 2 estimated by the estimation unit 8 (S33). When the communication unit 4 receives a response signal to the request signal (S34, YES), the identification unit 5 identifies the flying object 2 using the airframe ID included in the response signal (S35). While the communication unit 4 transmits information about the identified flying object 2 to the communication terminal 40 (S36), when the communication unit 4 is unable to receive a response signal to the request signal (S34, NO), the identification unit 5 determines that the flying object 2 at the estimated position is a suspicious flying object 2 (S37). The communication unit 4 transmits a result of the determination to the communication terminal 40 (S38). If the identification unit 5 determines that there is no flying object associated with the airframe ID included in the response signal received in Step S34, the identification unit 5 may also determine that the flying object 2 at the estimated position is a suspicious flying object 2. If the airframe ID is not included in the response signal received in Step S34, the identification unit 5 may also determine that the flying object 2 at the estimated position is a suspicious flying object 2.

As described above, the air traffic control system 31 according to the third example embodiment can identify the flying object 2 based on the image received from the communication terminal 40 and the position information about the communication terminal 40. Thus, the air traffic control system 31 can provide the user of the communication terminal 40 with the information about the flying object 2 and the result of determining whether the flying object 2 is a suspicious flying object 2.

Fourth Example Embodiment

Figure 11:
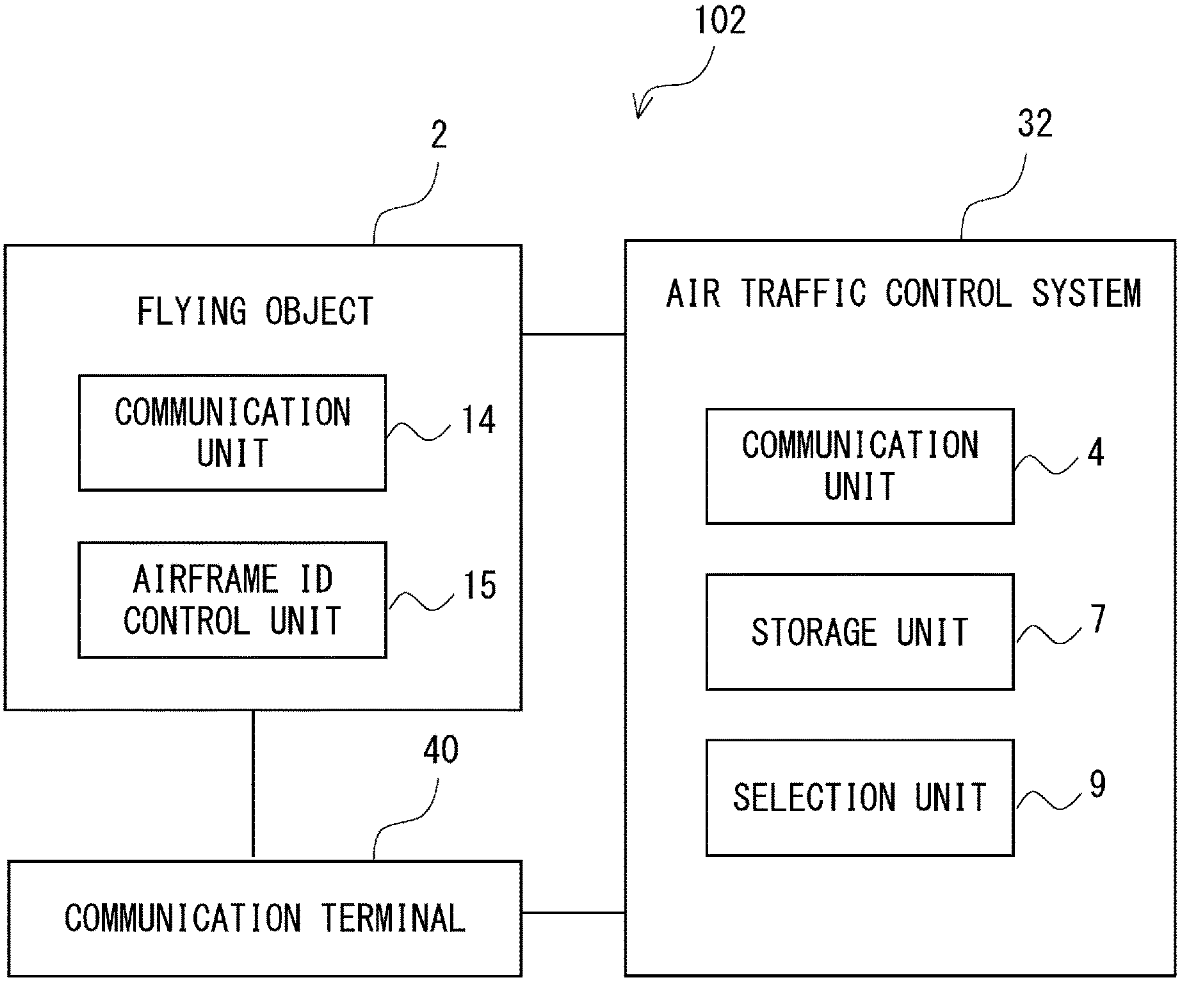
FIG. 11 is a block diagram showing a configuration of a flying object identification system according to a fourth example embodiment.

FIG. 11 is a block diagram showing a configuration of a flying object identification system 102 according to a fourth example embodiment. The flying object identification system 102 according to the fourth example embodiment includes a flying object 2, an air traffic control system 32, and a communication terminal 40. The flying object 2 includes a communication unit 14 and an airframe ID control unit 15. The air traffic control system 32 includes a communication unit 4, a storage unit, 7 and a selection unit 9. The flying object identification system 102 according to the fourth example embodiment is a system that discloses appropriate information to the communication terminal 40 according to an authority level of the communication terminal 40. In the flying object identification system 102 according to the fourth example embodiment, components similar to those according to the first to third example embodiments are denoted by the same signs, and detailed descriptions thereof are omitted as appropriate.

The communication terminal 40 can acquire the airframe ID by communicating wirelessly with the flying object 2. A communication method such as Bluetooth (registered trademark) may be used for the wireless communication. The authority level is assigned to the communication terminal 40 in advance. The communication terminal 40 can acquire information about the flying object 2 from the air traffic control system 32 by transmitting an inquiry message including the airframe ID and the authority level acquired from the flying object 2 to the air traffic control system 32.

The storage unit 7 of the air traffic control system 32 according to the fourth example embodiment manages and stores the airframe IDs of the flying object 2 and a plurality of pieces of information about the flying object 2 indicated by the airframe IDs in association with each other. The storage unit 7 may manage the plurality of pieces of information about the flying object 2 in association with a plurality of authority levels. For example, as shown in FIG. 12, the storage unit 7 stores the plurality of pieces of information about the flying object 2 according to the authority level. Information at an authority level 3 corresponds to personal information about the user of the flying object 2, and information at an authority level 2 corresponds the flight path and the remaining level of the battery 17. Information at an authority level 1 corresponds information about the destination of the flying object 2. These are examples only, and an administrator or the user of the flying object 2 may be able to set the authority level corresponding to the information about the flying object 2.

When the communication unit 4 receives the inquiry message including the airframe ID and the authority level assigned to the communication terminal 40 from the communication terminal 40, the selection unit 9 refers to the storage unit 7. The selection unit 9 selects information to be transmitted to the communication terminal 40 from among the plurality of pieces of information about the flying object 2 associated with the airframe ID according to the authority level of the communication terminal 40. The communication unit 4 transmits the information about the flying object 2 selected by the selection unit 9 to the communication terminal 40.

The selection unit 9 can select the information about the flying object 2 associated with the authority level assigned to the communication terminal 40 as follows. For example, regarding an inquiry from the communication terminal 40 of the authority level 3 held by the police, the selection unit 9 selects the information at the authority level 3. Similarly, regarding an inquiry from the communication terminal 40 of the authority level 2 held by a traffic information center, the selection unit 9 selects the information at the authority level 2. Further, regarding an inquiry from the communication terminal 40 of the authority level 1 held by the general public, the selection unit 9 selects the information at the authority level 1.

Alternatively, the selection unit 9 may select information about the flying object 2 associated with an authority level assigned to the communication terminal 40 and an authority level lower than the assigned authority level. Specifically, the selection unit 9 selects information at the authority levels 1 to 3 for an inquiry from the communication terminal 40 of the authority level 3 held by the police, and information at the authority levels 1 and 2 for an inquiry from the communication terminal 40 of the authority level 2 held by the traffic information center. For an inquiry from the communication terminal 40 of the authority level 1 held by the general public, the selection unit 9 selects information at the authority level 1.

For an inquiry for information at the authority levels higher than the authority level assigned to the communication terminal 40, the selection unit 9 does not select the information about the flying object 2. In this case, the communication unit 4 may notify the communication terminal 40 that it is unable to provide information about the flying object 2.

In this way, the selection unit 9 can select information to be transmitted to the communication terminal 40 according to the authority level of the communication terminal 40.

Figure 13:
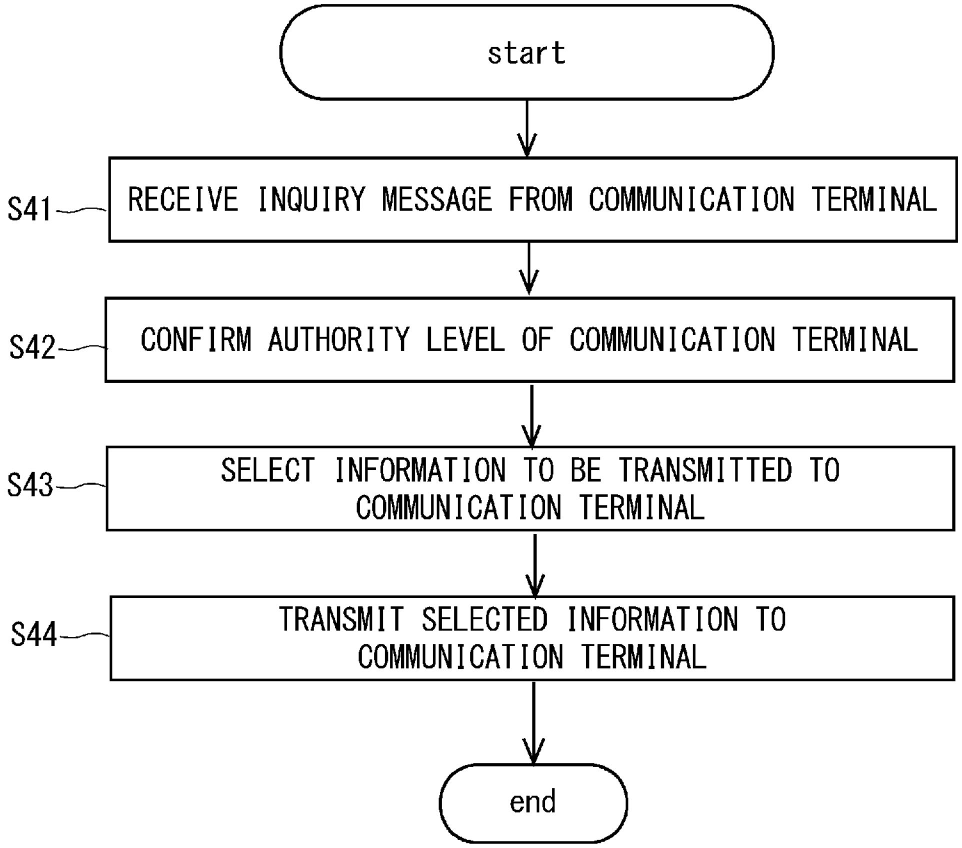
FIG. 13 is a flowchart showing an operation of an air traffic control system according to the fourth example embodiment.

FIG. 13 is flowchart showing an operation of the air traffic control system 32 according to the fourth example embodiment.

The communication unit 4 receives, from the communication terminal 40, an inquiry message including the airframe ID and the authority level assigned to the communication terminal 40 (S41). The selection unit 9 confirms the authority level included in the inquiry message of the communication terminal 40 (S42). The selection unit 9 refers to the storage unit 7 and selects the information about the flying object 2 corresponding to the authority level of the communication terminal 40 (S43). The communication unit 4 transmits the information selected by the selection unit 9 to the communication terminal 40 (S44).

As described above, the air traffic control system 32 according to the fourth example embodiment provides information about the flying object 2 according to the authority level of the communication terminal 40. This enables the air traffic control system 32 to suppress the leakage of information about the flying object 2 and to improve security. The air traffic control system 32 can provide information about the flying object 2 appropriately according to the situation while improving security.

Fifth Example Embodiment

Figure 14:
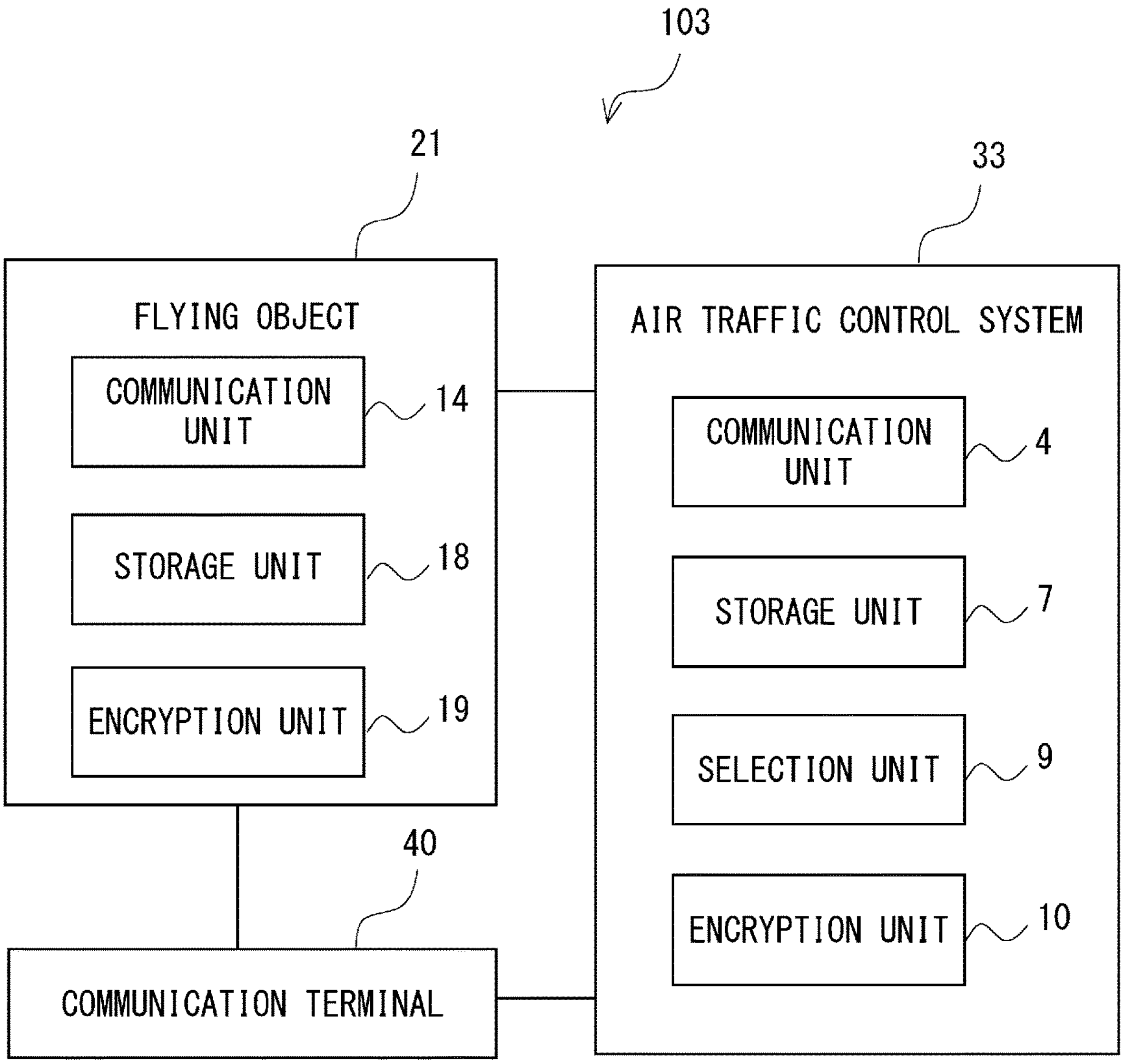
FIG. 14 is a block diagram showing a configuration of a flying object identification system according to a fifth example embodiment.

FIG. 14 is a block diagram showing a configuration of a flying object identification system 103 according to a fifth example embodiment. The flying object identification system 103 according to the fifth example embodiment includes a flying object 21, an air traffic control system 33, and a communication terminal 40. The flying object 21 includes a communication unit 14, a storage unit 18, and an encryption unit 19. The air traffic control system 33 includes a communication unit 4, a storage unit 7, a selection unit 9, and an encryption unit 10. In the flying object identification system 103 according to the fifth example embodiment, components similar to those according to the first to fourth example embodiments are denoted by the same signs, and detailed descriptions thereof are omitted as appropriate. The flying object 21 according to the fifth example embodiment can encrypt information held therein according to the authority level and transmit the encrypted information. In addition, the flying object identification system 103 according to the fifth example embodiment, like the flying object identification system 102 according to the fourth example embodiment, is a system that discloses appropriate information to the communication terminal 40 according to the authority level of the communication terminal 40.

The storage unit 18 of the flying object 21 stores flying object information, which is information about the flying object 21, in association with the authority level. For example, as shown in FIG. 12 above, the storage unit 18 stores a plurality of pieces of flying object information about the flying object 21 according to the authority level. For example, the personal information about the user of the flying object 21 corresponds to the information at the authority level 3, and the information about the flight path and the remaining level of the battery 17 corresponds to the information at the authority level 2. The information about the destination of the flying object 21 corresponds to the information at the authority level 1. These are examples only, and the administrator or the user of the flying object 21 may set the authority level corresponding to flying object information about the flying object 21. That is, the flying object 21 can set which information among the pieces of information to be transmitted to which authority level to disclose. Also, the flying object 21 can set which information to be transmitted.

The encryption unit 19 encrypts flying object information associated with a predetermined authority level. For example, when the predetermined authority level is 3, the encryption unit 19 encrypts the flying object information associated with the authority level 3. When the predetermined authority level is 1 to 3, the encryption unit 19 may encrypt all pieces of the flying object information associated with the authority levels 1 to 3. The communication unit 14 transmits the encrypted flying object information. It should be noted that the flying object information is airframe information, such as a flight path, the personal information about the airframe owner and the airframe administrator, payload, airframe information, transit information, airframe state such as an occurrence of malfunctions and remaining level of energy, and maintenance information.

The communication terminal 40 has an authority level according to the status of the user and can decrypt the encrypted flying object information received from the flying object 21. Examples of the users of the communication terminals 40 include the police, a tarmac administrator, and the general public. For example, the police have the communication terminal 40 to which the authority level 3 is assigned, the tarmac administrator has the communication terminal 40 to which the authority level 2 is assigned, and the general public has the communication terminal 40 to which the authority level 1 is assigned.

For example, when the encryption unit 19 encrypts the flying object information about the flying object 21 associated with the authority level 3 and the communication unit 14 transmits the encrypted flying object information, the communication terminal 40 of the authority level 3 held by the police can decrypt the encrypted flying object information at the authority level 3 of the flying object 21. In this case, the communication terminal 40 of the authority level 2 held by the tarmac administrator or the communication terminal 40 of the authority level 1 held by the general public cannot decrypt the encrypted flying object information at the authority level 3. Moreover, the communication terminal 40 of the authority level 3 can receive the flying object information associated with the authority level 1 or 2. The communication terminal 40 of the authority level 3 can also decrypt the encrypted flying object information at the authority level 1 or 2. That is, the communication terminal 40 can acquire the flying object information associated with an authority level of the corresponding flying object and an authority level lower than the authority level of the corresponding flying object.

As explained above, the flying object 21 according to the fifth example embodiment can encrypt the information held therein according to the authority level and transmit the encrypted information to the owner of the communication terminal 40 of an appropriate authority level while improving security.

The air traffic control system 33 according to the fifth example embodiment can also disclose appropriate information to the communication terminal 40 according to the authority level of the communication terminal 40 in response to an inquiry from the communication terminal 40. As shown in FIG. 14, the air traffic control system 33 according to the fifth example embodiment further includes the encryption unit 10 in addition the configuration of the air traffic control system 32 according to the fourth example embodiment.

The encryption unit 10 of the air traffic control system 33 encrypts the information about the flying object 21 associated with a predetermined authority level. For example, when the predetermined authority level is 3, the encryption unit 10 encrypts the flying object information about the flying object 21 associated with the authority level 3. When the predetermined authority level is 1 to 3, the encryption unit 10 may encrypt all pieces of the flying object information associated with the authority levels 1 to 3. The communication unit 4 transmits the encrypted information about the flying object 21. The communication terminal 40 of the authority level 3 can obtain information about the flying object 21 of the authority level 3 by decrypting the information about the encrypted flying object 21 of the authority level 3. The operation of the air traffic control system 33 is described below with reference to FIG. 15.

Figure 15:
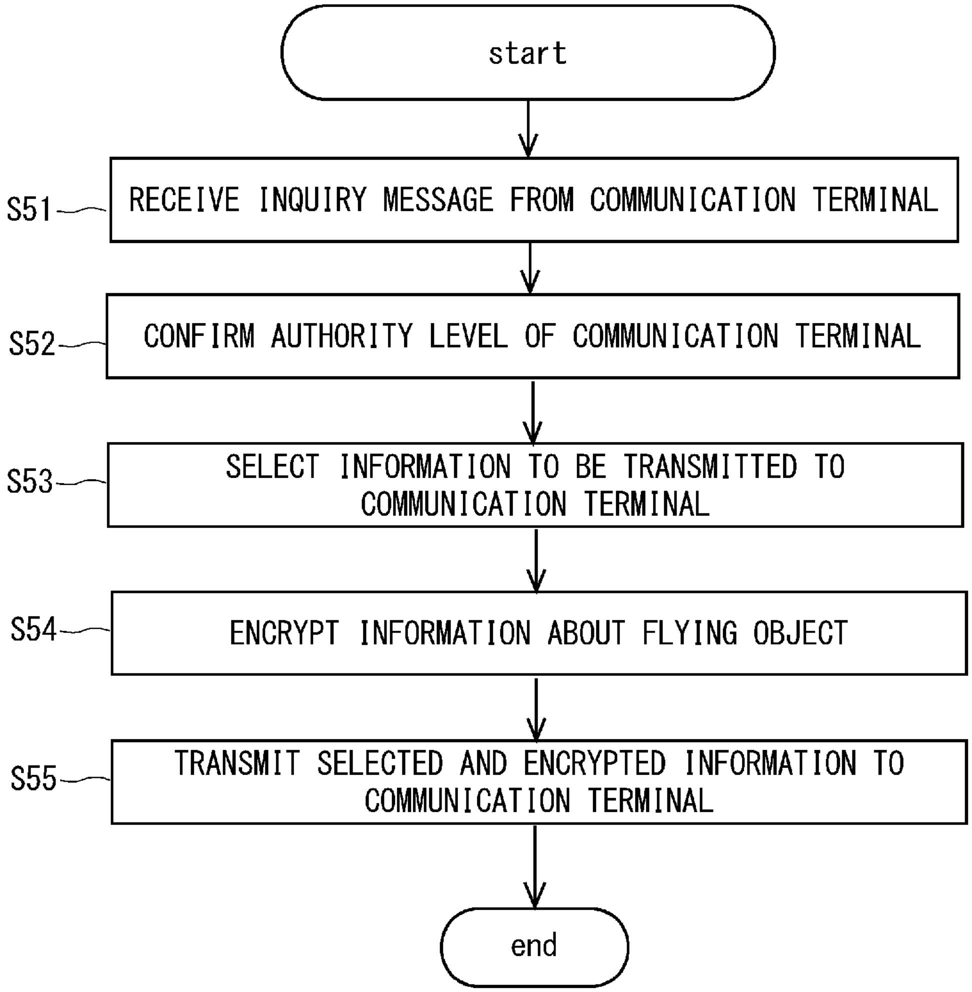
FIG. 15 is a flowchart showing an operation of an air traffic control system according to the fifth example embodiment.

FIG. 15 is a flowchart showing an operation of the air traffic control system 33 according to the fifth example embodiment. First, the communication unit 4 receives, from the communication terminal 40, an inquiry message including the airframe ID and the authority level assigned to the communication terminal 40 (S51). The selection unit 9 confirms the authority level included in the inquiry message of the communication terminal 40 (S52). When the selection unit 9 confirms that the authority level of the communication terminal is 3, the selection unit 9 refers to the storage unit 7 and selects the information about the flying object 21 corresponding to the authority level 3 (S53). When the predetermined authority level is 3, the encryption unit 10 encrypts the information about the flying object 21 corresponding to the authority level 3 (S54). The communication unit 4 transmits, to the communication terminal 40, the information about the flying object 21 corresponding to the authority level 3 selected by the selection unit 9 and encrypted by the encryption unit 10 (S55).

As explained above, the air traffic control system 33 according to the fifth example embodiment can prevent interception by other communication terminals 40 by providing the encryption unit 10. Thus, the air traffic control system 33 can further suppress the leakage of information about the flying object 21, and improve security of a communication system between the communication terminals 40 and the air traffic control system 33. The air traffic control system 33 can provide information about the flying object 21 appropriately according to the situation while improving security.

In the fourth or fifth example embodiment, the flying object 2 and the flying object 21 may, in case of emergency, transmit emergency information including a malfunction and a landing site directly to the communication terminal 40 without using the air traffic control system 32 and the air traffic control system 33, respectively. The flying object 2 and the flying object 21 may also broadcast the emergency information to the communication terminal 40 on the ground present at a landing site and a landing path. The landing path is a flight path from an occurrence of an emergency such as a malfunction in the flying object 2 and the flying object 21 to the landing of the flying object 2 and the flying object 21 at the landing site. The flying object 2 and the flying object 21 may broadcast the emergency information to the communication terminal 40 on the ground via a mobile network managed by a communication provider without using the air traffic control system 32 and the air traffic control system 33, respectively. Thus, even if the communication with the air traffic control system 32 and the air traffic control system 33 is disconnected in an emergency, the flying object 2 and the flying object 21 can immediately transmit the emergency information to the communication terminal 40, thereby reducing damage caused by an accident.

Figure 16:
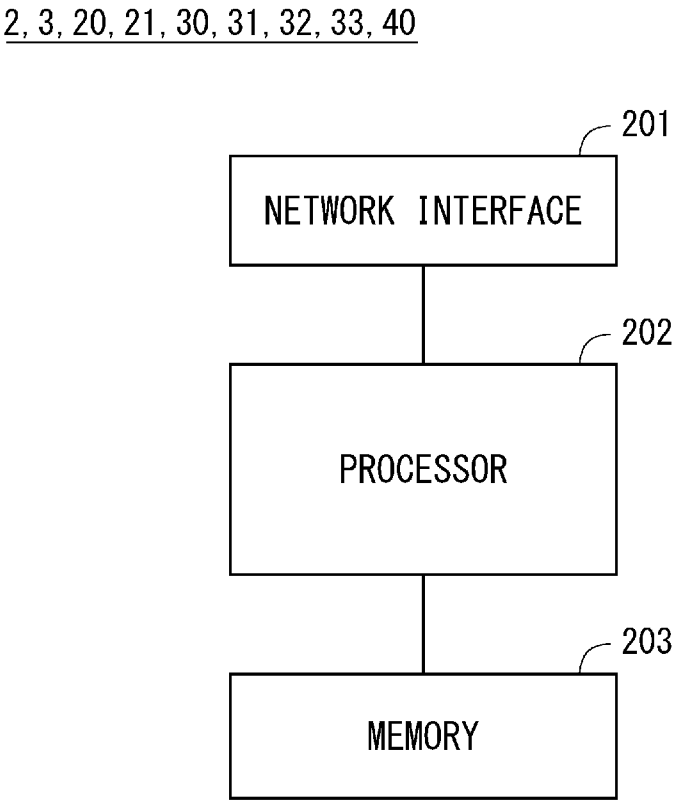
FIG. 16 is a block diagram showing an example of a configuration of a control apparatus in the flying object, the air traffic control system, and a communication terminal according to each of the example embodiments.

FIG. 16 is a block diagram showing an example of a configuration of each of the control apparatuses in the flying object 2, the flying object 20, the flying object 21, the air traffic control system 3, the air traffic control system 30, the air traffic control system 31, the air traffic control system 32, the air traffic control system 33, and the communication terminal 40 according to each example embodiment. With reference to FIG. 16, each of these control apparatuses include a network interface 201, a processor 202, and a memory 203. The network interface 201 may be used to communicate with network nodes (e.g., eNB, MME, P-GW). The network interface 201 may include, for example, a network interface card (NIC) that complies with the IEEE 802.3 series. Here, eNB stands for evolved Node B, MME stands for Mobility Management Entity, and P-GW stands for Packet Data Network Gateway. IEEE stands for Institute of Electrical and Electronics Engineers.

The processor 202 reads and executes the software (computer program) from the memory 203 to perform the processing of the flying object 2, the flying object 20, the flying object 21, the air traffic control system 3, the air traffic control system 30, the air traffic control system 31, the air traffic control system 32, the air traffic control system 33, and the communication terminal 40 described in the above example embodiments. The processor 202 may be, for example, a microprocessor, an MPU or a CPU. The processor 202 may include more than one processor.

The memory 203 is composed of a combination of volatile and non-volatile memories. The memory 203 may include a storage that is separate from the processor 202. In this case, the processor 202 may access the memory 203 via an I/O (Input/Output) interface (not shown).

In the example of FIG. 16, the memory 203 is used to store software modules. By reading and executing these groups of software modules from the memory 203, the processor 202 can perform operations and processes related to the flying object 2, the flying object 20, the flying object 21, the air traffic control system 3, the air traffic control system 30, the air traffic control system 31, the air traffic control system 32, the air traffic control system 33, and the communication terminal 40 described in the above example embodiments.

As described with reference to FIG. 16, each of the processors included in the control apparatuses of the flying object 2, the flying object 20, the flying object 21, the air traffic control system 3, the air traffic control system 30, the air traffic control system 31, the air traffic control system 32, the air traffic control system 33, and the communication terminal 40 in the above example embodiments executes one or more programs including instructions for causing the computer to perform the operations and processing described in the above example embodiments.

In the above example, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R, CD-R/W, and semiconductor memories (such as Mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure has been described above with reference to the example embodiments, but the present disclosure is not limited by the above. Various modifications can be made to the configurations and details of the present disclosure that are understandable to those skilled in the art within the scope of the disclosure.

The whole or part of the example embodiments disclosed above can be described as, but not limited to, the following supplementary notes.

(Supplementary Note 1)

A flying object comprising:

an airframe ID control unit configured to hold an airframe ID of the flying object changed according to a predetermined change pattern; and a communication unit configured to transmit the airframe ID (Supplementary Note 2)

The flying object according to Supplementary note 1, wherein the airframe ID is a randomly generated ID and an ID that is changed according to at least one of the number of flights and a duration of the flight of the flying object.

(Supplementary Note 3)

The flying object according to Supplementary note 1 or 2, wherein the airframe ID control unit shares the change pattern of the airframe ID with the air traffic control system controlling the flights of the flying object.

(Supplementary Note 4)

The flying object according to any one of Supplementary notes 1 to 3, further comprising:

a flight control unit configured to identify a position of the flying object based on information acquired by a sensor, wherein the communication unit transmits the airframe ID and position information related to the position identified by the flight control unit.

(Supplementary note 5)

An air traffic control system comprising:

a communication unit configured to acquire a first airframe ID and position information transmitted from a flying object; and an identification unit configured to identify the flying object using the first airframe ID, wherein when the communication unit acquires a second airframe ID different from the first airframe ID after acquiring the first airframe ID, the identification unit determines whether or not the second airframe ID indicates the flying object based on a change between the position information at the time of acquiring the first airframe ID and the position information at the time of acquiring the second airframe ID.

(Supplementary Note 6)

The air traffic control system according to Supplementary note 5, further comprising:

a storage unit configured to store a change pattern of the airframe ID transmitted by the flying object, and the identification unit determines whether or not the second airframe ID indicates the flying object based on a change in the position information acquired at different timings and the change pattern.

(Supplementary Note 7)

The air traffic control system according to Supplementary note 6, wherein the storage unit stores a flight plan of the flying object, and the identification unit determines whether or not the second airframe ID indicates the flying object based on the change between the position information acquired at different timings, the change pattern, and the flight plan.

(Supplementary Note 8)

The air traffic control system of Supplementary note 7, wherein the storage unit stores the flight plan of the flying object including a flight path generated based on performance information of the flying object.

(Supplementary Note 9)

The air traffic control system according to Supplementary note 7 or 8, further comprising:

an estimation unit configured to estimate, when communication with the flying object is disconnected, a position of the flying object in flight based on the position information about the flying object at the time of the communication disconnection and the flight plan, wherein when the communication is restored, the identification unit determines whether or not the second airframe ID indicates the flying object using a result of a comparison between the position information about the flying object at the time of the communication restoration and the estimated position and the change pattern.

(Supplementary Note 10)

A method for identifying a flying object comprising:

acquiring a first airframe ID and position information transmitted from the flying object; and identifying the flying object using the first airframe ID, wherein when a second airframe ID different from the first airframe ID is acquired after acquiring the first airframe ID, it is determined whether or not the second airframe ID indicates the flying object based on a change between the position information at the time of acquiring the first airframe ID and the position information at the time of acquiring the second airframe ID.

(Supplementary Note 11)

A non-transitory computer readable medium storing a program for causing a computer to execute processing of:

acquiring a first airframe ID and position information transmitted from the flying object; and identifying the flying object using the first airframe ID, wherein when a second airframe ID different from the first airframe ID is acquired after acquiring the first airframe ID, it is determined whether or not the second airframe ID indicates the flying object based on a change between the position information at the time of acquiring the first airframe ID and the position information at the time of acquiring the second airframe ID.

REFERENCE SIGNS LIST

1, 100, 101, 102, 103 FLYING OBJECT IDENTIFICATION SYSTEM
2, 20, 21 FLYING OBJECT
3, 30, 31, 32, 33 AIR TRAFFIC CONTROL SYSTEM
4 COMMUNICATION UNIT
5 IDENTIFICATION UNIT
6 GENERATION UNIT
7 STORAGE UNIT
8 ESTIMATION UNIT
9 SELECTION UNIT
10 ENCRYPTION UNIT
11 FLIGHT CONTROL UNIT
12 DRIVE MECHANISM
13 SENSOR
14 COMMUNICATION UNIT
15 AIRFRAME ID CONTROL UNIT
16 DISPLAY UNIT
17 BATTERY
18 STORAGE UNIT
19 ENCRYPTION UNIT
40 COMMUNICATION TERMINAL
201 NETWORK INTERFACE
202 PROCESSOR
203 MEMORY

What is claimed is:

1. An air traffic control system comprising:

at least one memory storing instructions, and at least one processor configured to execute the instructions to;

acquire a first airframe ID and position information transmitted from a flying object; and identify the flying object using the first airframe ID, wherein the at least one processor is further configured to execute the instructions to:

determine, when a second airframe ID different from the first airframe ID is acquired after acquiring the first airframe ID, whether or not a flying object transmitting the second airframe ID is identical to the flying object transmitting the first airframe ID based on a change between the position information at the time of acquiring the first airframe ID and the position information at the time of acquiring the second airframe ID, based on a determination that the flying object transmitting the second airframe ID is different from the flying object transmitting the first airframe ID, establish communication with the flying object transmitting the second airframe ID to perform air traffic control, and based on a determination that the flying object transmitting the second airframe ID is identical to the flying object transmitting the first airframe ID, continue performing air traffic control with the flying object.

2. The air traffic control system according to claim 1, wherein the at least one processor is further configured to execute the instructions to:

store a change pattern of the airframe ID transmitted by the flying object, and determine whether or not the flying object transmitting the second airframe ID is identical to the flying object transmitting the first airframe ID based on a change in the position information acquired at different timings and the change pattern.

3. The air traffic control system according to claim 2, wherein the at least one processor is further configured to execute the instructions to:

store a flight plan of the flying object, and determine whether or not the flying object transmitting the second airframe ID is identical to the flying object transmitting the first airframe ID based on the change between the position information acquired at different timings, the change pattern, and the flight plan.

4. The air traffic control system of claim 3, wherein the at least one processor is further configured to execute the instructions to:

store the flight plan of the flying object including a flight path generated based on performance information of the flying object.

5. The air traffic control system according to claim 3, the at least one processor is further configured to execute the instructions to:

estimate, when communication with the flying object is disconnected, a position of the flying object in flight based on the position information about the flying object at the time of the communication disconnection and the flight plan, wherein determine, when the communication is restored, whether or not the flying object transmitting the second airframe ID is identical to the flying object transmitting the first airframe ID using a result of a comparison between the position information about the flying object at the time of the communication restoration and the estimated position and the change pattern.

6. A method for identifying a flying object comprising:

acquiring a first airframe ID and position information transmitted from the flying object; and identifying the flying object using the first airframe ID, wherein when a second airframe ID different from the first airframe ID is acquired after acquiring the first airframe ID, it is determined whether or not the flying object transmitting the second airframe ID is identical to the flying object transmitting the first airframe ID based on a change between the position information at the time of acquiring the first airframe ID and the position information at the time of acquiring the second airframe ID, based on a determination that the flying object transmitting the second airframe ID is different from the flying object transmitting the first airframe ID, establishing communication with the flying object transmitting the second airframe ID to perform air traffic control, and based on a determination that the flying object transmitting the second airframe ID is identical to the flying object transmitting the first airframe ID, continuing performing air traffic control with the flying object.

7. The method for identifying a flying object according to claim 6, further comprising:

storing a change pattern of the airframe ID transmitted by the flying object, and determining whether or not the flying object transmitting the second airframe ID is identical to the flying object transmitting the first airframe ID based on a change in the position information acquired at different timings and the change pattern.

8. The method for identifying a flying object according to claim 7, further comprising:

storing a flight plan of the flying object, and determining whether or not the flying object transmitting the second airframe ID is identical to the flying object transmitting the first airframe ID based on the change between the position information acquired at different timings, the change pattern, and the flight plan.

9. The method for identifying a flying object according to claim 8, further comprising:

storing the flight plan of the flying object including a flight path generated based on performance information of the flying object.

10. The method for identifying a flying object according to claim 8, further comprising:

estimating, when communication with the flying object is disconnected, a position of the flying object in flight based on the position information about the flying object at the time of the communication disconnection and the flight plan, and determining, when the communication is restored, whether or not the flying object transmitting the second airframe ID is identical to the flying object transmitting the first airframe ID using a result of a comparison between the position information about the flying object at the time of the communication restoration and the estimated position and the change pattern.

11. A non-transitory computer readable medium storing a program for causing a computer to execute processing of:

acquiring a first airframe ID and position information transmitted from the flying object; and identifying the flying object using the first airframe ID, wherein when a second airframe ID different from the first airframe ID is acquired after acquiring the first airframe ID, it is determined whether or not the flying object transmitting the second airframe ID is identical to the flying object transmitting the first airframe ID based on a change between the position information at the time of acquiring the first airframe ID and the position information at the time of acquiring the second airframe ID, based on a determination that the flying object transmitting the second airframe ID is different from the flying object transmitting the first airframe ID, establishing communication with the flying object transmitting the second airframe ID to perform air traffic control, and based on a determination that the flying object transmitting the second airframe ID is identical to the flying object transmitting the first airframe ID, continuing performing air traffic control with the flying object.

12. The non-transitory computer readable medium according to claim 11, wherein the program further causes a computer to execute processing of:

storing a change pattern of the airframe ID transmitted by the flying object, and determining whether or not the flying object transmitting the second airframe ID is identical to the flying object transmitting the first airframe ID based on a change in the position information acquired at different timings and the change pattern.

13. The non-transitory computer readable medium according to claim 12, wherein the program further causes a computer to execute processing of:

storing a flight plan of the flying object, and determining whether or not the flying object transmitting the second airframe ID is identical to the flying object transmitting the first airframe ID based on the change between the position information acquired at different timings, the change pattern, and the flight plan.

14. The non-transitory computer readable medium according to claim 13, wherein the program further causes a computer to execute processing of:

storing the flight plan of the flying object including a flight path generated based on performance information of the flying object.

15. The non-transitory computer readable medium according to claim 13, wherein the program further causes a computer to execute processing of:

estimating, when communication with the flying object is disconnected, a position of the flying object in flight based on the position information about the flying object at the time of the communication disconnection and the flight plan, and determining, when the communication is restored, whether or not the flying object transmitting the second airframe ID is identical to the flying object transmitting the first airframe ID using a result of a comparison between the position information about the flying object at the time of the communication restoration and the estimated position and the change pattern.

* * * * *